(12) United States Patent
Shibayama et al.

(10) Patent No.: US 7,702,945 B2
(45) Date of Patent: Apr. 20, 2010

(54) SEMICONDUCTOR DEVICE AND COMMUNICATION CONTROL METHOD

(75) Inventors: Atsufumi Shibayama, Tokyo (JP); Koichi Nose, Tokyo (JP); Masayuki Mizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 452 days.

(21) Appl. No.: 11/575,473

(22) PCT Filed: Sep. 16, 2005

(86) PCT No.: PCT/JP2005/017165

§ 371 (c)(1),
(2), (4) Date: Mar. 16, 2007

(87) PCT Pub. No.: WO2006/030904

PCT Pub. Date: Mar. 23, 2006

(65) Prior Publication Data

US 2008/0218225 A1  Sep. 11, 2008

(30) Foreign Application Priority Data

Sep. 16, 2004 (JP) ............................. 2004-270435

(51) Int. Cl.
*G06F 1/04* (2006.01)
(52) U.S. Cl. .................... 713/501; 713/320; 713/322; 713/500; 713/600
(58) Field of Classification Search ................ 713/320, 713/322, 500, 501, 600
See application file for complete search history.

(56) References Cited

U.S. PATENT DOCUMENTS 7,089,443 B2 * 8/2006 Albonesi et al. ............ 713/501
7,412,678 B2 * 8/2008 Lahner et al. ............... 716/6
2005/0060597 A1 * 3/2005 Albonesi et al. ............ 713/600
2007/0016817 A1 * 1/2007 Albonesi et al. ............ 713/500

FOREIGN PATENT DOCUMENTS

| JP | 6-45880 | 2/1994 |
| JP | 7-306827 | 11/1995 |
| JP | 2001-77797 | 3/2001 |
| JP | 2003-273847 | 9/2003 |

* cited by examiner

*Primary Examiner*—Abdelmoniem Elamin
(74) *Attorney, Agent, or Firm*—Dickstein Shapiro LLP

(57) ABSTRACT

The present invention relates to a technique capable of establishing communications between cores, which can provide a large degree of freedom of clock frequencies settable in each core, and thus providing deterministic operation, small communication latency, and high reliability. An object of the present invention is to provide a semiconductor device with high reliability, by analyzing factors affecting the performance of the semiconductor device, based on the communication histories within the semiconductor device, and reflecting the analysis back to the next generation semiconductor devices. The improved semiconductor device includes a core A for transmitting data in sync with the clock signal clkA, a core B for receiving data in sync with the clock signal clkB coincided with the rising or falling of the clock signal clkA in a constant period, and a controller for controlling communications between the core A and the core B. The controller controls in such way that the core B can receive only the data arriving prior to the setup of the clock signal clkB. The controller stores the history on a communication status between cores.

18 Claims, 20 Drawing Sheets

FIG. 12
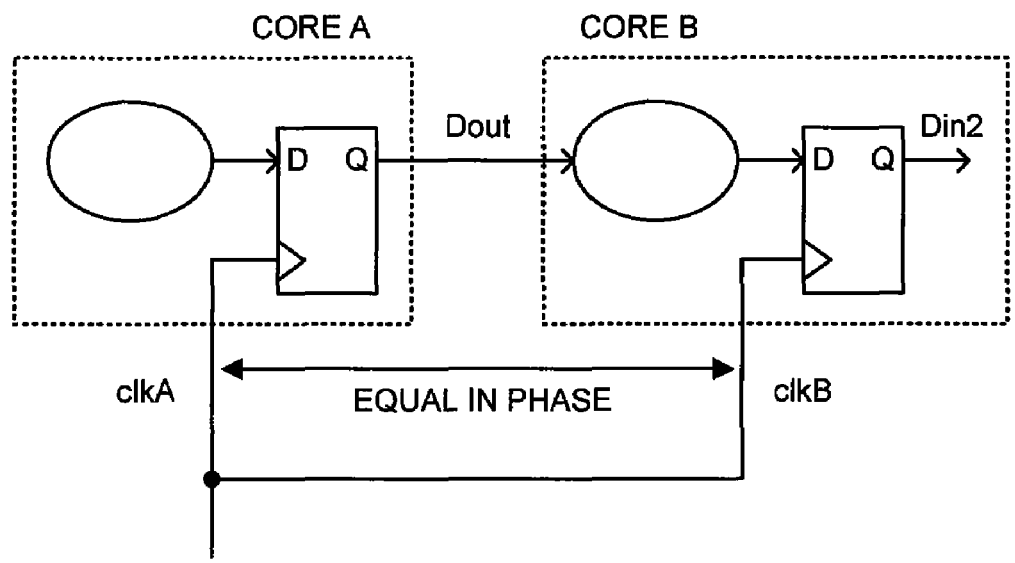
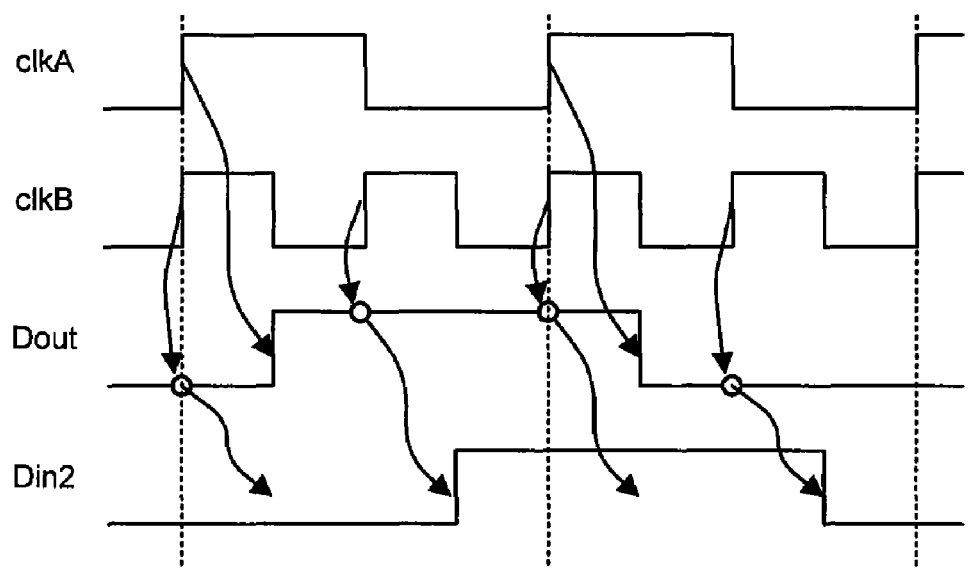

SEMICONDUCTOR DEVICE AND COMMUNICATION CONTROL METHOD

TECHNICAL FIELD

The present invention relates to a semiconductor device having plural function blocks. Particularly, the present invention relates to a semiconductor device and method for establishing communications between plural cores, each which operates at a different clock frequency.

BACKGROUND OF THE RELATED ART

Conventionally, as the method for establishing communications between cores (or function blocks), each which operates at a different clock frequency, there are chiefly two types of communication method, that is, synchronous system and asynchronous system.

FIG. 12 is a diagram illustrating a semiconductor device for establishing communications in the synchronous scheme.

When communications between cores A and B are established by such a semiconductor device, the synchronous scheme requires that the clock frequency ratio for two cores in communication is 1:times of integer number (for example, 1:2, 1:3, . . . , etc.) or 1:a fraction of integer number (for example, 1:½, 1:⅓, . . . , etc.) and that the phases of two clocks must be equalized. That is, the synchronous communication can be established between only the cores in which clocks are in synchronous state.

FIG. 13 is a diagram illustrating a semiconductor device for establishing communications in the asynchronous scheme.

Communications between cores, in which the clock frequency ratio of two cores is not 1:times of integer number or 1:times of a fraction of integer number and the phase between two clocks is not equalized, are called asynchronous communications. In the asynchronous communications, the timing with which signals are output and the timing with which signals are input are in asynchronous relationship. The signal fluctuates between "0" and "1" for a certain time period (called "metastability"). For that reason, a technique of using a synchronizing circuit to prevent an erroneous operation due to metastability is generally provided (refer to, for example, patent document 1).

According to the technique disclosed in the patent document 1, a synchronizing circuit is disposed between a first core that performs a predetermined operation in sync with the first clock signal and a second core that performs a predetermined operation in sync with the second clock signal. The synchronizing circuit latches the output data of the first core in sync with the first clock signal and thus outputs the latched signal in sync with the second clock signal.

Moreover, the technique of preventing an erroneous operation due to metastability is proposed (refer to, for example, patent document 2).

In the technique disclosed in the patent document 2, changes of the data input signal and the clock input signal are detected. When the setup time or hold time is satisfied, the erroneous operation caused by metastability is prevented by controlling in such a way that the data input signal of the flip-flop is not changed.

[Patent Document 1]
Japanese Patent laid-open publication No. 2003-273847
[Patent Document 2]
Japanese Patent laid-open publication No. H6-45880

DISCLOSURE OF THE INVENTION

Problems to be Solved by the Invention

The conventional synchronous systems have the problem that the clock frequency ratio of respective cores is restricted to 1:times of integer number or 1:a fraction of integer number. This restriction becomes more serious problems with an increasing number of cores in communication.

Recently, the dynamic frequency voltage scaling system (DFVS) has proposed that dynamically changes the frequency and power source voltage at operation time for each core to reduce the consumed power. When DFVS is implemented for each core, the synchronous relationship between cores cannot be maintained because varying the power source voltage results in varying the distributed clock delay. That is, the conventional synchronous system has the problem that communications cannot be established. Moreover, there is the problem that the limitation of the clock frequency settable by each core results in a decrease of the effect of reducing the power in DFVS.

The asynchronous system, disclosed in the patent document 1, has the following problems.

Firstly, there is the problem of non-deterministic operation. The operation in clock cyclic levels becomes non-deterministic depending on characteristic variations or operational environment of a chip device. As a result, costs in verification, debugging, or test of hardware/software will increase.

Secondly, the asynchronous system has the problem that the communication latency is large. The communication latency increases because of the delay taken for synchronization so that the communication throughput decreases. As a result, that causes a decrease in performance and an increase in area and power for compensation of the performance decrease.

Thirdly, there is the problem that the possible erroneous operation due to metastability results in a decreased reliability. This becomes worse with an increasing clock frequency or an increased area for low voltage or synchronization. Improving the reliability requires acquiring sufficiently the time for solving the metastability. However, this results in more increasing the delay necessary for synchronization so that the communication latency increases.

In the technique disclosed in the patent document 2, variations of the data input signal and the clock input signal are detected in operation and whether or not the setup time or hold time is satisfied is determined. However, since the decision criterion varies depending on characteristic variations or operational environments of a chip device, the operation in clock cycle levels becomes non-deterministic.

The present invention is made to solve the above-mentioned problems. An object of the present invention is to provide a technique of capable of establishing communications between cores, each having a large degree of freedom of settable clock frequency, and providing deterministic operation, small communication latency, and high reliability.

Another object of the present invention is to provide a semiconductor device with high reliability by analyzing factors influencing the performance of a semiconductor device based on communication histories within a semiconductor device and reflecting the factors back to next generation semiconductor devices.

Means to Solve the Problems

In a first aspect of the present invention to solve the above-mentioned problems, a semiconductor device comprises a first signal processing circuit for outputting data based on a first clock signal; a second signal processing circuit for receiving data based on a second clock signal coincided with the rising or falling of the first clock signal in a constant period; and a control circuit for controlling in such a way that data only arriving prior to a setup time of the second clock signal is received.

In a second aspect of the present invention, a semiconductor device comprises a first signal processing circuit for outputting data based on a first clock signal; a second signal processing circuit for receiving data based on a second clock signal, which has a phase difference of a fixed value with the rising or falling of the first clock signal, in a constant period; and a control circuit for controlling in such a way that data only arriving prior to a setup time of the second clock signal is received.

In the semiconductor device, the control circuit comprises an output control circuit that controls such that a predetermined number of data are output in a constant period, in the order that plural pieces of data are input in sync with the first clock signal.

In the semiconductor device, the control circuit comprises an input control circuit that controls such that data arriving prior to the setup time of plural pieces of data is selectively input.

In the semiconductor device, the control circuit comprises an output control circuit that controls the first signal processing circuit so as not to output data which does not arrive prior to the setup time.

In the semiconductor device, the control circuit comprises an input control circuit that controls the second signal processing circuit so as not to input data which does not arrive prior to the setup time.

In the semiconductor device, the control circuit comprises a delay selection control circuit for controlling so as to receive delayed data, the delayed data being obtained by delaying data which does not arrive prior to the setup time, by a fixed time period, by means of a delaying part.

In the semiconductor device, the delaying part delays data which does not arrive prior to the setup time, by one clock of the second clock signal.

In the semiconductor device, the data is process request data representing a process request or process request reset data representing that process request data has been received, the process request data and the process request reset data being output from a first function part which performs a predetermined operation in sync with the first clock.

In the semiconductor device, the process request data and the process request reset data correspond to data exchanged between the first function part and the second function part which performs a predetermined operation in sync with the second clock.

In the semiconductor device, the process request data and the process request reset data correspond to data exchanged between the first function part and a bus.

The semiconductor device further comprises history storage means stores as history information an operation status during transmission and reception of the data.

The semiconductor device further comprises analysis means for analyzing a cause in performance degradation of a semiconductor device, based on history information saved in the history storage means.

In the semiconductor device, the history storage means includes output means for externally outputting the history information.

In the semiconductor device, the setup time is dynamically varied in operation.

A communication control method suitable in a semiconductor device comprises the step of controllably receiving data only arriving prior a setup time of a second clock signal, of data transmitted based on the first clock signal, the second clock signal coinciding with the rising or falling of a first clock signal in a fixed period.

A communication control method suitable in a semiconductor device comprises the step of controllably receiving data only arriving prior to a setup time of a second clock signal, of data transmitted based on the first clock signal, the second clock signal having a phase difference of a constant value with respect to the rising or falling of a first clock signal in a fixed period.

The communication control method further comprises the step of controllably outputting a predetermine of number of data in a fixed period, in the order that plural pieces of data are input in sync with the first clock signal.

The communication control method further comprises the step of receiving controllably and selectively data arriving prior to the setup time of plural pieces of data.

The communication control method further comprises the step of controlling so as not to output data which does not arrive prior to the setup time.

The communication control method further comprises the step of controlling so as not to receive data which does not arrive prior to the setup time.

The communication control method further comprising the step of delaying data which does not arrive prior to the setup time by a constant time using a delaying part and controllably receiving the delayed data.

The communication control method further comprises the step of delaying data which does not arrive prior to the setup time, by one clock of the second clock signal, using the delaying part.

In the communication control method, the setup time is dynamically varied in operation.

In the semiconductor device according to the present invention, when the time difference between the edge of the clock on the transmission side and the edge of the clock on the receiving side is larger than the delay design value Td determined in a certain design, data communications are established. If the time difference is smaller than the delay design value Td, data communications are not established.

The method in which the transmission side does not output data at the clock edge or the receiving side does not input data at the corresponding clock edge is quoted as a first method of inhibiting data communications. In the second method, data is delayed and the receiving side inputs the delayed data at the edge of the next clock on the receiving side.

Effect of the Invention

According to the present invention, the clock frequency for each core can be set arbitrarily within a range previously expected in designing and the synchronous communications are established with the clock. For that reason, the present invention can realize the core to core communication, which provides deterministic operation, small communication latency, high reliability. This feature can avoid the metastability problem troubled in the asynchronous scheme and can realize the core to core communication, which provides an operation deterministic in cyclic level and provides low latency and low throughput.

Moreover, since the factor affecting the performance of a semiconductor device is analyzed based on the communication history within the semiconductor device, the analysis results can be reflected back to the next generation semiconductor devices. Thus, this feature can provide high reliable semiconductor devices.

BEST MODE FOR CARRYING OUT THE INVENTION

Embodiments according to the present invention will be explained below.

A semiconductor device according to the present invention includes a core A for transmitting data in sync with the clock signal clkA, a core B for receiving data in sync with the clock signal clkB coinciding with the rising or falling of the clock signal clkA in certain constant periods, and a controller for controlling communications between the cores A and B.

The controller controls such that the core B receives only the data arriving prior to the setup time of the clock signal clkB.

In the control method, when the time corresponding to the phase difference between the rising edge of the clock signal clkA and the rising edge of the clock signal clkB, which rises immediately after the rising of the clock signal clkA, is a delay design value Td or less, the core A does not output data or the core B does not input data. Alternatively, when the time corresponding to the phase difference between the rising edge of the clock signal clkA and the rising edge of the clock signal clkB, which rises immediately after the rising of the clock signal clkA, is Td or less, data is delayed. Thus, the core B inputs data with the timing of the next clock edge.

Embodiments will be specifically described below.

Embodiment 1

A first embodiment of the present invention will be explained below.

FIG. 1 is a diagram illustrating the configuration of a semiconductor device according to the first embodiment of the present invention.

Each of cores A and B is a circuit block having a predetermined function, for example, a CPU (central processing unit) or DSP (digital signal processor). Each core performs a predetermined process in sync with clocks.

Clock signals to be input to respective cores will be explained here.

FIG. 2 is a timing chart for a clock signal clkA to be input to the core A and a clock signal clkB to be input to the core B.

Provided that an arbitrary reference frequency is f (f>0), the frequency of the clock signal clkA is designed to be mf (m is an integer) and the frequency of the clock signal clkB is designed to be nf (n is an integer). Before the clock signals clkA and clkB are input, the phase adjusting circuit 10 adjusts the phase relationship between the clock signals clkA and clkB to be fixed constantly, that is, to match the rising or falling edges of respective clock signals in certain constant periods. In the clock signal clkA, such adjusted, the phase relationship to the clock signal clkB is circulated every m cycles (or becomes in phase). In the clock signal clkB, such adjusted, the phase relationship to the clock signal clkA is circulated every n cycles (or becomes in phase). FIG. 2 shows the case where m is 8 and n is 5, that is, the case where the frequency of the clock signal clkA is 8f and the frequency of the clock signal clkB is 5f. In such a case, the clock signal clkA matches with the rising edge of the clock signal clkB every eight cycles of the clock signal clkA. The clock signal clkB matches with the rising edge of the clock signal clkA every five cycles of the clock signal clkB. The cycle at which the rising edges of the clock signals clkA and clkB coincide is set to be 0. The number attached to each cycle of each clock is called a phase number. Starting from the phase number of 0, the rising edge of the clock signal clkA matches with the rising edge of the clock signal clkB after m cycles. The rising edge of the clock signal clkB matches with the rising edge of the clock signal clkA after n cycles. Hence, the phase number is sufficiently represented by m and n. The phase adjusting circuit 10 can be realized with a delay adjustment circuit such as a DLL (digital locked loop) circuit. For example, even when the voltage for each core varies dynamically, the phase adjusting circuit can dynamically perform the phase adjustment, following to the voltage variation.

Referring again FIG. 1, the core A includes various function parts 3A, a flip-flop 1, and a data output control circuit 101, each which performs predetermined operations in sync with the clock signal clkA. The function part corresponds to, for example, a function executor, such as CPU or DSP.

The flip-flop 1 outputs signals to the clock signal clkA under control of the data output control circuit 101. In the present embodiment, the case is explained where the signal is output with the timing at which the edge of the clock signal clkA rises. However, the signal may be output with the timing at which the edge of the clock signal clkA falls.

In order to transmit data from the core A to the core B, the data output control circuit 101 controls the flip-flop 1 based on the frequency of the clock signal clkA, the frequency of the clock signal clkB, and the phase number of the clock signal clkA. In this case, only the data arriving prior to the set-up time of the flip-flop 2 in the core B is transmitted in consideration of the data transmission time from the core A to the core B. In detail, when data, for example, is output with the timing of the rising edge of the phase number 3 of the clock signal clkA in FIG. 2, the timing with which the data is input corresponds to the timing of the rising edge of the clock signal clkB behind the rising edge of the phase number 3 of the clock signal clkA. However, when the time period between the rising edge of the clock signal clkA and the rising edge of the clock signal clkB, for example, the rising edge of the phase number 2 of the clock signal clkB, which rises lately, is too short, the right data cannot be input. When the time period, corresponding to the phase difference, between the rising edge of the clock signal clkA and the rising edge of the clock signal clkB, which rises lately, is the delay design value Td or less, the data output control circuit 101 controls the flip-flop 1, in such a way that data is not output with timing of the rising edge of the phase number 3 of the clock signal clkA. When there are two rising edges with the phase difference exceeding the delay design value Td to the rising edge of the phase number 1 of the clock signal clkB, as shown with the phase numbers 0 and 1 of the clock signal clkA in FIG. 2, the data output control circuit 101 controls the flip-flop 1 so as not to output data with the timing of either rising edge. Otherwise, the data output control circuit 101 controls the function section 3A in the core A to output data to the flip-flop 1 in either cycle only.

The core B includes various function parts 3B, a flip-flop 2, and a data input control circuit 102, each which performs a predetermined operation in sync with the clock signal clkB.

The flip-flop 2 receives signals in sync with the clock signal clkB, under control of the data input control circuit 102. In the present embodiment, the case will be explained where data is input with the timing of the rising edge of the clock signal clkB. It is assumed that the data may be input with the timing of the falling edge of the clock signal clkB.

When the data is transmitted from the core A to the core B, the data input control circuit 102 controls the flip-flop 2 based on the frequencies of the clock signals clkA and clkB and the phase number of the clock signal clkB. By doing so, data, which does not arrive prior to the set-up time of the flip-flop 2 in the core B, is not input. In detail, when the phase difference between the rising edge of the clock signal clkA and the rising edge of the clock signal clkB is the delay design value Td or less, the data input control circuit 102 controls the flip-flop 2 so as not to input data in the corresponding cycle.

A method of determining the delay design value Td will be explained by referring to FIG. 3.

The delay design value Td is set by considering the data transmission time between the time at which the flip-flop 1 starts to transmit data, with the timing of a rising edge of the clock signal clkA, and the time at which the core B receives the data. In detail, the delay design value Td is set to be Tcyc(min)>Td>TskewG+Tsu +Tff, where TskewG is (clock skew time+clock jitter time) between the clock signal clkA and the clock signal clkB, Tff is a delay time of a flip-flop, Tsu is a set-up time of a flip-flop, and Tcyc(min) is a minimum cycle time (a cycle time at a maximum frequency).

In succession, the operation of the present embodiment will be explained. In explanation of the present embodiment, m=8 and n=5.

FIG. 4 is a time chart explaining the operation where the data output control circuit 101 performs the data output control when the core A transmits data to the core B, in the present embodiment.

In FIG. 4, the clock signal clkA is used for the core A while the clock signal clkB is used for the core B. Because of m=8, the frequency of the clock signal clkA is 8f and the phase number ranges 0 to 7. Because of n=5, the frequency of the clock signal clkB is 5f and the phase number ranges 0 to 5. When the clock signal clkA and the clock signal clkB have phase numbers of 0, respectively, the phases thereof (the timings of respective clock signals) are in phase. Hence, the phase relationship is circulated every eight cycles of the clock signal clkA and every five cycles of the clock signal clkB. In other words, the data output control circuit 101 performs the data communication control by considering the phase relationship in eight cycles of the clock signal clkA and in five cycles of the clock signal clkB. Dout_EN represents the control signal from the data output control circuit 101 and Din_EN represents the control signal from the data output control circuit 102. Dout is the input signal that is output from the flip-flop 1. Din is the signal that is output from the flip-flop 2 and is received by the function part 3B in the core B.

When half of the cycle time of the clock signal clkA is selected as the delay design value Td, the time corresponding to the phase difference between the rising edge of the phase number 3 of the clock signal clkA and the rising edge of the phase number 2 of the clock signal clkB or between the rising edge of the phase number 6 of the clock signal clkA and the rising edge of the phase number 4 of the clock signal clkB becomes Td or less, as shown in FIG. 4. That phenomenon is understood based on the frequency of each of the clock signal clkA and the clock signal clkB and based on the phase number of the clock signal clkA. In this case, the data output control circuit 101 implements the control to disable data communication.

In the control in such a way that the core A does not output data, the data output control circuit 101 receives the frequency 8f of the clock signal clkA, the frequency 5f of the clock signal clkB, and the phase numbers 0-7 of the clock signal clkA. Thus, the data output control circuit 101 controls the core A with the timings of the rising edges of the phase numbers 3 and 6 of the clock signal clkA. The core A can input data output with the timings of the rising edges of the phase numbers 0 and 1 of the clock signal clkA, with the timing of the rising edge of the phase number 1 of the clock signal clkB. However, the case will be explained here where the output control circuit 101 controls in such a way that it does not output data with the timing of the phase number 0, in order to receive the data output with the timing of the rising edge of the phase number 1 of the clock signal clkA.

The data output control circuit 101 sets the control signal Dout_EN to a high level with the timing of the rising edge of the phase number 0 of the clock signal clkA to output data with the phase numbers 1 and 2 of the clock signal clkA.

The data output control circuit 101 sets the control signal Dout_EN at a low level after a lapse of a hold time from the timing corresponding to the rising edge of the phase number 2 of the clock signal clkA. By doing so, the flip-flop 1 does not output data with the timing corresponding to the rising edge of the phase number 3 of the clock signal clkA.

The data output control circuit 101 sets the control signal Dout_EN at a high level after a lapse of a hold time from the timing corresponding to the rising edge of the phase number 3 of the clock signal clkA. By doing so, the flip-flop 1 outputs data with the timing corresponding to the rising edge of the phase number 4 of the clock signal clkA.

The data output control circuit 101 sets the control signal Dout_EN at a low level after a lapse of a hold time from the timing of the rising edge corresponding to the phase number 5 of the clock signal clkA. Thus, the flip-flop 1 does not output data with the timing corresponding to the rising edge of the phase number 6 of the clock signal clkA.

The data output control circuit 101 sets the control signal Dout_EN at a high level after a lapse of a hold time from the timing of the rising edge corresponding to the phase number 6 of the clock signal clkA. Thus, the flip-flop 1 can output data with the timing corresponding to the rising edge of the phase number 7 of the clock signal clkA.

Next, the data output control circuit 101 sets the control signal Dout_EN at a low level with the timing of the rising edge corresponding to the phase number 7 of the clock signal clkA. Thus, the flip-flop 1 does not output data with the timing corresponding to the rising edge of the phase number 0 of the clock signal clkA.

The metastability problem, confronted with the asynchronous scheme, can be avoided by repeating the above-mentioned operations. The core to core communication, which provides deterministic operation in cycle level, low latency and low throughput, can be realized.

There are two methods each for controllably inhibiting data communication when the time corresponding to a phase difference is Td or less. That is, in the first method, the data output control circuit 101 controls the flip-flop 1 such that the core A does not output data with the timing thereof. In the second method, the data input control circuit 102 controls the flip-flop 2 such that the core B does not input data with the timing thereof.

Next, the method in which the data input control circuit 102 controls the flip-flop 2 will be explained below.

FIG. 5 is a time chart explaining the operation in which the data input control circuit 102 controls data input when data is transmitted from the core A to the core B in the present embodiment.

The data input control circuit 102 implements a control operation in such a way that the core B does not input data output with the timings of the rising edges of the phase numbers 3 and 6 of the clock signal clkA, as described above. Moreover, the core B can input data output with the timings of the rising edges of the phase numbers 0 and 1 of the clock signal clkA, with the timing of the rising edge of the phase number 1 of the clock signal clkB. However, the case where the function part 3A of the core A outputs data with only the timing of the rising edge of the phase number 0 or 1 of the clock signal clkA will be explained here. Similarly, it is assumed that the function part 3A in the core A outputs data with only the timing of the rising edge of one of the phase numbers 2, 3 and 4 of the clock signal clkA. Similarly, it is assumed that the function part 3A in the core A outputs data with only the timing of the rising edge of one of the phase numbers 5, 6 and 7 of the clock signal clkA.

First, the data input control circuit 102 sets the control signal Din_EN at a low level with the timing of the rising edge of the phase number 1 of the clock signal clkB in such a way that the flip-flop 2 does not input the data output by the flip-flop 1 with the timing of the rising edge of the phase number 3 of the clock signal clkA, with the timing of the rising edge of the phase number 2 of the clock signal clkB.

The data input control circuit 102 sets the control signal Din_EN at a high level with the timing of the rising edge of the phase number 2 of the clock signal clkB in such a way that the flip-flop 2 can input the data output by the flip-flop 1 with the timing of the rising edge of the phase number 4 of the clock signal clkA, with the timing of the rising edge of the phase number 3 of the clock signal clkB.

The data input control circuit 102 sets the control signal Din_EN at a low level with the timing of the rising edge of the phase number 3 of the clock signal clkB in such a way that the flip-flop 2 does not input the data output by the flip-flop 1 with the timing of the rising edge of the phase number 6 of the clock signal clkA, with the timing of the rising edge of the phase number 4 of the clock signal clkB.

The data input control circuit 102 sets the control signal Din_EN at a high level with the timing of the rising edge of the phase number 4 of the clock signal clkB in such a way that the flip-flop 2 can input the data output by the flip-flop 1 with the timing of the rising edge of the phase number 7 of the clock signal clkA, with the timing of the rising edge of the phase number 0 of the clock signal clkB. Because the control signal Din_EN sustains the high level, the flip-flop 2 accepts the data output from the flip-flop 1 with the timing of the rising edge of the phase number 1 of the clock signal clkA, with the timing of the rising edge of the phase number 1 of the clock signal clkB.

Repeating the above-mentioned operations allows the metastability problem confronted with the asynchronous scheme to be avoided. This can realize the core to core communications with deterministic operation in cycle level, low latency, and low throughput.

In the present embodiment, the configuration of a semiconductor device, which includes the data output control circuit 101 and the data input control circuit 102, has been explained. However, the present invention should not be limited to only the present embodiment. The semiconductor device may include either one of the control circuits 101 and 102. Moreover, the case where data is transmitted from the core A to the core B has been explained in the present embodiment. The core A has the data output control circuit 101 and the core B has the data input control circuit 102. However, when the core B transmits data to the core A, the core A includes the data input control circuit 102 while the core B includes the data output control circuit 101. Furthermore, each of the cores A and B may include the data output control circuit 101 or the data input control circuit 102 to establish data transmission/reception between the cores A and B.

Embodiment 2

In the explanation of the first embodiment, when the time corresponding to the phase difference is the delay design value Td or less, the data communication is not carried out. However, the core B may receive delayed data with the timing of the next clock edge. In the second present embodiment, a data delaying method will be explained below. Like reference numerals are attached to the same elements as those in the first embodiment and hence the detailed explanation for them will be omitted here.

FIG. 6 is a diagram illustrating the configuration of a semiconductor device according to the second embodiment.

The flip-flop 1 outputs the signal in sync with the clock signal clkA. In the present embodiment, the case will be explained where signals are output with the timing of the rising edges of the clock signal clkA. However, signals may be output with the timing of the falling edges of the clock signal clkA.

The flip-flop 2 receives the signal in sync with the clock signal clkB. In the present embodiment, the case will be explained where signals are input with the timing of the rising edges of the clock signal clkB. However, signals may be input with the timing of the falling edges of the clock signal clkB.

The delay element 30 delays the data output from the flip-flop 1 by the delay value Tdly.

The method for determining the delay value Tdly will be explained here by referring to FIG. 3.

Like the delay design value Td, the delay value Tdly is determined by considering the data transmission time period between the time the core A starts to transmit data at a rising edge of the clock signal clkA and the time the core B receives the data.

Tdly is set to be (TskewG+Tsu+Tho<Tdly<Tcyc(min)−TskewL−Tsu−Tff), where Tcyc(min) represents a minimum cycle time (a cycle time at a maximum frequency), TskewG represents (clock skew+clock jitter) between the clock signal clkA and the clock signal clkB, TskewL represents (clock skew+clock jitter) within the clock signal clkA or clkB, Tpd represents the phase difference between the clock signal clkA and the clock signal clkB, Tff represents a delay by the flip-flop, Tsu represents a setup time of the flip-flop, and Tho represents a hold time of the flip-flop.

The data delay selection control circuit 103 controls the selector 4 based on the frequency of the clock signal clkA, the frequency of the clock signal clkB and the phase number of the clock signal clkB. Thus, the flip-flop 2 selectively receives the output data Dout from the core A or the data Dout_DLY obtained by delaying the output data Dout by the delay value Tdly through the delay element 30.

The selector 4 selects the output value Dout or Dout_DLY, based on the control signal Dsel sent from the data delay selection control circuit 103.

In succession, the operation of the present embodiment will be explained below.

FIG. 7 is a timing chart explaining the operation of the data delay selection control circuit 103. In the operation of the present embodiment, the reference frequency is f, the frequency of the clock signal clkA is 8f, and the frequency of the clock signal clkB is 5f.

Referring to FIG. 7, the clock signal clkA is used for the core A while the clock signal clkB is used for the core B. Because of m=8, the frequency of the clock signal clkA is 8f and the phase number ranges from 0 to 7. Because of n=5, the frequency of the clock signal clkB is 5f and the phase number ranges from 0 to 4. The phase numbers of the clock signals clkA and clkB are 0, the phase is in-phase (the rising edges of respective clock signals match in timing). Therefore, the phase relationship circulates every eight cycles of the clock signal clkA or every five cycles of the clock signal clkB. In other words, the data delay selection control circuit 103 implements the data communication control by considering the phase relationship in the eight cycles of the clock signal clkA or in the five cycles of the clock signal clkB. Data Dout, which is output from the flip-flop 1, is not delayed. Data Dout_DLY is obtained by delaying the output data from the flip-flop by means of the delay element. Data Dsel is a control signal from the data delay selection control circuit 103. Data Din is output from the flip-flop 2.

As shown in FIG. 7, the phase difference between the rising edge of the phase number 3 of the clock signal clkA and the rising edge of the phase number 2 of the clock signal clkB is Td or less. The phase difference between the rising edge of the phase number 6 of the clock signal clkA and the rising edge of the phase number 4 of the clock signal clkB is Td or less. This is understood by referring to the frequencies of the clock signals clkA and clkB and the phase number of the clock signal clkB. In this case, the data delay selection control circuit 103 selects as data input by the flip-flop 2 data obtained by delaying data output from the flip-flop 1, by Tdly, by means of the delay element, with the timing of the rising edges of the phase numbers 3 and 6 of the clock signal clkA. In other words, data is not transmitted and received at the rising edge of the phase number 3 of the clock signal clkA and the rising edge of the phase number 2 of the clock signal clkB and at the rising edge of the phase number 6 of the clock signal clkA and the rising edge of the phase number 4 of the clock signal clkB. Instead, the data delay selection control circuit 103 controls the selector 4 such that the flip-flop 2 receives data delayed by Tdly by means of the delay element 30. Thus, data is input at the rising edge of the phase number 3 of the clock signal clkA and the rising edge of the phase number 3 of the clock signal clkB and at the clock edge of the phase number 6 of the clock signal clkA and the rising edge of the phase number 0 of the clock signal clkB.

First, the data delay selection control circuit 103 outputs Dsel at a low level with the timing of the rising edge of the phase number 1 of the clock signal clkB. By doing so, the flip-flop 2 receives data, which is output from the flip-flop 1 with the timing of the rising edge of the phase number 0 or 1 of the clock signal clkA, from Dout, with the timing of the rising edge of the phase number 1 of the clock signal clkB.

The data delay selection control circuit 103 sets the control signal Dout at a high level with the timing of the rising edge of the phase number 1 of the clock signal clkB. Thus, the data delay selection control circuit 103 receives the data, output from the flip-flop 1 through Dout_DLY, with the timing of the rising edge of the phase number 3 of the clock signal clkA.

The data delay selection control circuit 103 sets the control signal Dsel at a low level with the timing of the rising edge of the phase number 2 of the clock signal clkB. Thus, the data output from the flip-flop 1 is input via Dout, with the timing of the rising edge of the phase number 4 of the clock signal clkA.

The data delay selection control circuit 103 sets the control signal Dsel at a high level with the timing of the rising edge of the phase number 3 of the clock signal clkB. Thus, the data output from the flip-flop 1 is input via Dout_DLY, with the timing of the rising edge of the phase number 6 of the clock signal clkA.

The data delay selection control circuit 103 sets the control signal Dsel at a low level with the timing of the rising edge of the phase number 4 of the clock signal clkB. Thus, the data delay selection control circuit 103 receives the data Dout, which is output from the flip-flop 1, with the timing of the rising edge of the phase number 7 of the clock signal clkA.

The above-mentioned configuration can avoid the metastability problem confronted with the asynchronous scheme. Thus, the present embodiment can realize the core to core communications with deterministic operation in cycle level, with low latency, and with low throughput.

Embodiment 3

In the present embodiment, a handshaking circuit embodying the semiconductor device mentioned above will be explained below. Like reference numerals are attached to the same elements as those in the above configuration and hence the further detailed explanation will be omitted here. The present embodiment will be explained together with the second embodiment. However, the semiconductor device explained in the first embodiment may be used in the present embodiment.

FIG. 8 is a handshaking circuit for request, incorporating the semiconductor device of the second embodiment. Request means process request data in data communications and data processing.

The handshaking circuit 80 includes a data delay selection control circuit 103A, a data delay selection control circuit 103B, a data delay selection circuit 20A, a data delay selection circuit 20B, a data delay element 30, and a synchronous SR flip-flop 81. Moreover, the handshaking circuit 80 includes a level shifter circuit 82 that converts a difference in power source voltage between the cores A and B.

The function part 3A of the core A notifies the core B of the presence of a request, via the handshaking circuit 80. The core B acknowledges the core A that the request has been received. The presence and absence of the request are held in the synchronous flip-flop 81 shared by the cores A and B. The data delay selection circuit 20A in the core A and the data delay selection circuit 20B in the core B respectively perform the synchronous handshaking process.

In succession, the operation of the handshaking will be explained below.

First, the operation of setting a request will be explained below.

The function part 3A in the core A changes the Req_set signal to a high level to set a request to the synchronous SR flip-flop 81 (step BS301).

When the request has been set, the synchronous SR flip-flop 81 outputs a signal of a high level from the output Dout thereof (step BS302).

The output Dout at a high level representing that the request has been set is output to Req_B through the data delay selection circuit 20B on the side of the core B. Thus, the presence of the request in the core B is informed (step BS303).

The step BS303 will be explained in detail.

When Dout changes to a high level, the data delay selection control circuit 103B controls to input the signal from Dout if the time period between the rising edge of the clock signal clkA immediately prior to the high level transition and the rising edge of the clock signal clkB is Td or more, as shown with the phase number 0, 1 or 3 of the clock signal clkB in FIG. 7. The flip-flop 2 receives the signal from Dout with the timing of the rising edge of the clock signal clkB and outputs it to Req_B.

When the time period between the rising of the immediate previous clock signal clkA and the rising of the clock signal clkB is Td or less, as shown with the phase number 2 or 4 of the clock signal clkB in FIG. 7, the data delay selection control circuit 103 controls to input the signal from Dout_DLY, which is obtained by delaying Dout by Tdly by means of the delay element 30. The flip-flop 2 receives the signal with the timing of the rising edge of the clock signal clkB and then outputs it to Req_B.

As shown with the phase number 0 of the clock signal clkB in FIG. 7, when the rising of the clock signal clkA synchronizes with the rising of the clock signal clkB, the data delay selection control circuit 103 controls to output Dout directly to Req_B, without inputting it to the flip-flop 2.

By referring to the frequency of the clock signal clkA, the frequency of the clock signal clkB, the phase number of the clock signal clkB, and the delay design value Td, the data delay selection control circuit 103B performs the control operation in the above-mentioned manner. This control allows the metastability to be avoided and a request from the core A to inform the cores B deterministically.

The Dout value of a high level, indicating that the request explained in the steps BS301 and BS302 is set, is output to Req_A through the data delay selection circuit 20A. The fact that the request has been set to the synchronous SR flip-flop 81 is informed to the core A (step AS303). The core A cannot set a new request while the previous request is being set.

The step AS303 will be explained in detail here.

When the time period between the rising edge of the clock signal clkB, immediately before Dout becomes a high level, and the rising edge of the clock signal clkA is Td or more, the data delay selection control circuit 103A controls to receive the signal from Dout. The flip-flop 1 receives the signal from Dout, with the timing of the rising edge of the clock signal clkA, and then outputs it to Req_A.

When the time period between the rising edge of the immediate previous clock signal clkB and the rising edge of the clock signal clkA is Td or less, the data delay selection control circuit 103A controls to input the signal from Dout_DLY, which is obtained by delaying Dout by Tdly by means of the delay element 30. The flip-flop 1 receives the signal with the timing of the rising edge of the clock signal clkA and outputs it to Req_A.

When the rising edge of the clock signal clkB synchronizes with the clock signal clkA, the data delay selection control circuit 103A controls to output the signal directly to Req_A, without inputting Dout to the flip-flop 1.

The data delay selection control circuit 103A performs the above control operation by referring to the frequency of the clock signal clkA, the frequency of the clock signal clkB, the phase number of the clock signal clkA, and the delay design value Td.

The operation of resetting the request set sequentially will be explained below.

When receiving the request or a process requested by a request has been completed, the core B turns Req_reset to a high level with the timing of the rising edge of the clock signal clkB. Thus, the core B rests the request held in the synchronous SR flip-flop 81 with the timing of the rising edge of the clocks signal clkB (step AR301). The fact that the request has been reset is output as the signal of a low level produced from the output Dout of the synchronous SR flop-flop 81 (step AR302).

Dout of a low level, indicating that the request has been set, is output to Req_A through the data delay selection circuit 20A on the side of the core A. Thus, the fact that the request is saved in the core A is informed (step AR303).

The step AR303 will be explained in detail below.

With Dout of a low level, the data delay selection control circuit 103A controls to input the signal from Dout when the time period between the rising edge of the immediate previous clock signal clkB and the rising edge of the clock signal clkA is Td or more. The flip-flop 1 receives the signal from Dout with the timing of the rising edge of the clock signal clkA and then outputs it to Req_A.

When the time period between the immediate previous rising edge of the clock signal clkB and the rising edge of the clock signal clkA is Td or less, the data delay selection control circuit 103A controls such that the signal from Dout_DLY, obtained by delaying Dout by Tdly by means of the delay element 30, is input. The flip-flop 1 receives the signal with the timing of the rising edge of the clock signal clkA and outputs it to Req_A.

When the rising edge of the clock signal clkA synchronizes with the rising edge of the clock signal clkB, the data delay selection control circuit 103A controls to output Dout directly to Req_A, without inputting it to the flip-flop 1.

The data delay selection control circuit 103A refers to the frequency of the clock signal clkA, the frequency of the clock signal clkB, the phase number of the clock signal clkA, and the delay design value Tdly to perform the above-mentioned control. As a result, the data delay selection control circuit 103A notifies the core A of the fact that a request has been reset. Thus, the core A can set a new request.

The event that the request, explained with the steps AR301 and AR302, has been reset is output as the Dout value to Req_B through the data delay selection circuit 20B in the core B. The event that the request has been reset to the synchronous SR flip-flop 81 is informed to the core B (step BR303). While the previous request is being set, the core A cannot set a new request.

The step BR303 will be explained in detail below.

With a change of the value of Dout to a low level, the data delay selection control circuit 103B controls to input the signal from Dout when the time period between the rising edge of the clock signal clkA immediately prior to the change and the rising edge of the clock signal clkB is Td or more. The flip-flop 2 receives the signal from Dout with the timing of the rising edge of the clock signal clkB and then outputs it to Req_B.

When the time period between the rising edge of the immediately preceding clock signal clkA and the rising edge of the clock signal clkB is Td or less, the data delay selection control circuit 103B controls to input the signal from Dout_DLY, which is obtained by delaying Dout by Tdly by means of the delay element 30. The flip-flop 2 receives the signal with the timing of the rising edge of the clock signal clkB and then outputs it to Req_B.

When the rising edge of the clock signal clkB synchronizes with the rising edge of the clock signal clkA, the data delay selection control circuit 103B does not input Dout directly to the flip-flop 1 but outputs it directly to Req_B.

The data delay selection control circuit 103B performs the above-mentioned control by referring to the frequency of the clock signal clkA, the frequency of the clock signal clkB, the phase number of the clock signal clkB, and the delay design value Tdly.

As described above, the handshaking circuit according to the present invention can transmit and receive requests between cores synchronously. This allows the metastability confronted with the asynchronous scheme to be avoided. The core to core communications can be realized with deterministic operation in cycle level and with low latency and low throughput.

Embodiment 4

A SOC (system on a chip), which includes a bus interface circuit having the handshaking circuit, according to the present invention, will be explained below.

FIG. 9 shows the configuration of a SOC according to the present invention.

All clock signals for respective cores, configuring a SOC, are phase adjusted in sync with the clock signal for the bus. The core-to-core communications are surely performed via the bus. This configuration allows arbitrary core-to-core communications to be realized with a small number of frequency steps, compared with the method for performing direct communications between cores, even when each core has a difference in frequency range. Moreover, even when the clock frequency and the power source voltage are changed, the phase adjustment circuit 10 can dynamically adjust the phase between clock signals to a fixed value, thus allowing the synchronous communications. That is, the metastability confronting with the asynchronous scheme can be avoided. The core-to-core communications can be realized with deterministic operation in cycle level and with low latency and low throughput.

FIG. 10 depicts the configuration of a bus interface circuit.

The bus interface circuit includes a request FIFO 2101, a data FIFO 2102, a data delay selection control circuit 103A, and a data delay selection control circuit 103B.

The request FIFO 2101 includes a plurality of handshaking circuits 80. The request FIFO 2101 synchronously notifies the bus (bus interconnect) 2120 of a request input from the core (master core) 2110 to MReq, via Req. The data FIFO outputs to the bus 2120 the command (Cmd), address (Addr) and data, corresponding to the request. The core (master core) 2110 shows the core that generally issues a request to the bus.

In succession, the operation of the core will be explained below.

The core receives a request to the bus via MReq and, at the same time, receives command/address/data of the request via MCmd/MAddr/MData. The bus interface circuit sets the request to any one of the handshaking circuits, which is unoccupied within the request FIFO, (or if there is the handshaking circuit to which a request is not set). Simultaneously, the command/address/data is saved into the data FIFO. The bus interface circuit acknowledges a receipt of a request to the core via the SAak. When the request cannot be received because of the absence of an unoccupied request FIFO, the bus interface circuit notifies the core of no acceptance via SAak.

The handshaking circuit synchronously outputs the request, which is set to the handshaking circuit of the request FIFO, to the bus via the Req. Simultaneously, the command/address/data, corresponding to the request, is derived from the data FIFO and is output to the bus via Cmd/Addr/Data.

When accepting the request, the bus notifies the bus interface circuit of the fact via Ack. The bus interface circuit resets the accepted request, which is set in the corresponding handshaking circuit. When the bus cannot accept a request, the bus acknowledges rejection to the bus interface circuit via Ack. The bus interface circuit outputs the request continuously to the bus until the request is accepted.

As described above, the bus interface circuit according to the present invention can transmit and receive requests synchronously between the core and the bus. Hence, the metastability confronted with the asynchronous scheme can be avoided. The core-to-core communications can be realized with deterministic operation in cycle level and with low latency and low throughput.

Embodiment 5

In the present embodiment, the configuration that maintains the operation status of each portion in core-to-core communications or in core-to-bus communications will be explained below. Like reference numerals are attached to the same elements as those of the above-mentioned configuration. Hence, the duplicate explanation will be omitted here.

FIG. 11 depicts an on-chip debugging circuit according to the present invention.

The core 110 operates in sync with the clock signal from the CLK generator 111. The core 110 also performs data communications to other cores via the handshaking circuit 80 and the bus. The core 110 is equivalent to the above-mentioned core (master core).

The CLK generator 111 creates clock signals in sync with the rising and falling of the clock signal for the bus in a certain period.

The history storage part 112 saves as history information the operational statuses of the core and bus, in which data are being actually input and output (being transmitted and received). For example, the history storage part 112 stores as history information the clock frequency for the core or bus, the timing with which the power source voltages for the core or bus changes and voltages after changes, and the timing with which the rising of the clock signal for the core synchronizes with the rising of the clock signal for the bus or the timing with which the falling of the clock signal for the core synchronizes with the falling of the clock signal for the bus. Moreover, the history storage part 112 also stores, as history information, part of data, such as LSB (least significant bit/byte), on the bus and the req signal transmit/receive timing and the ack signal transmit/receive timing signal. The history information may be saved with the timing at which the edge of the clock signal for the bus rises or falls. Alternatively, the history information may be saved with the timing at which the edge of the clock signal for the core rises or falls.

Based on the history information saved in the history storage part 112, the analyzer 113 analyzes the cause of degradation of the performance of a semiconductor device and controls the core frequency, the core power source voltage, the bus frequency, or the like. For instance, the analyzer 113 analyzes the transmit/receive timing of the req or ack signal based on the history information saved in the history storage part 112. When the transmission of the ack signal is slow, the bus frequency is increased. When the transmission of the req signal is slow, the core frequency is increased.

The output part 114 outputs the history information in the history storage part 112. The history information is simulated with the debugging S/W (software) to analyze the cause of degradation of the performance of a semiconductor device. The output part may save a predetermined volume of history information and then transmit them every predetermined volume. Moreover, the output part may transmit history information at a predetermined time or may transmit them in response to an external request.

In succession, the operation of the present embodiment will be explained below.

The core 110 performs data communications to other cores via the handshaking circuit 80 and the bus.

The history storage part 112 gathers various kinds of information and saves them as history information.

The analyzer 113 implements various analysis based on the history information and controls the core frequency, the core power source voltage, the bus frequency, or the like.

The history storage part 112 outputs the history information.

In the above-mentioned configuration, the operation status of the bus is saved as history information and the core frequency is controlled based on the history information. This allows the whole performance of a semiconductor device to be improved. Moreover, since the operational status of the core or bus in actual operation is saved and output as history information, this can be reflected to the next generation semiconductor devices.

Embodiment 6

In the second embodiment the method that the core B receives the data obtained by delaying data by a delay value Tdly when the phase difference is Td or less has been explained as the method for inhibiting the communication from the core A to the core B when the phase difference between the clock signal of the core A and the clock signal of the core B is the delay design value Td or less.

Referring to FIG. 6 explaining the configuration of the second embodiment, the core B includes the delay element 30 that delays data by Tdly. However, the core A may include the delay element 30. Instead of the delay element 30, a flip-flop that latches data with the falling edge of the clock signal may be used as a data delaying method.

FIG. 14 depicts the configuration of a semiconductor device employing the method where a flip-flop delays data, which latches data with the timing of the falling edge of the clock signal on the core A. Like reference numerals are attached to the same constituent elements as those in the second embodiment shown in FIG. 6 and hence the detailed explanation will be omitted here.

Referring to FIG. 14, the core A includes a flip-flop 230 that latches the output signal Dout of the flip-flop 1 with the falling edge of the clock signal clkA. That is, the flip-flop 230 delays the signal Dout by half of the cycle time of the clock signal clkA and then outputs it as Dout_DLY. This function is identical to that of the delay element 30 in the case where the delay value Tdly equals to half of the cycle time of the clock signal clkA. Hence, the operation of the present embodiment is similar to the second embodiment shown in FIG. 7. In the present embodiment, the delay value Tdly is limited to half of the cycle time of the clock signal clkA, compared with the configuration of the second embodiment. However, the present embodiment is immune advantageously to variations of the delay value of the delay element.

Embodiment 7

Another embodiment for communications from the core A to the core B will be explained by referring to FIG. 15. When the phase difference between the clock signal of the core A and the clock signal of the core B is the delay design value Td or less, data, obtained by delaying data by the delay value Tdly, is input to the core B. Like reference numerals are attached to the same constituent elements as those in the above embodiments and hence the detail explanation is omitted.

FIG. 15 is a diagram illustrating the configuration of a semiconductor device according to the present embodiment.

The core A includes flip-flops 231 and 232 with enable ports. The flip-flop 231 latches the signal Dout0 output from the function part 3A in sync with the clock signal clkA and outputs the signal Dout1 to the core B. The flip-flop 232 latches the signal Dout0 output from the function part 3A in sync with the clock signal clkA and outputs the signal Dout2 to the core B. In this case, only when the enable signals en1 and en2 indicate the operation, the flip-flops 231 and 232 latch and output the signal, respectively. The data output selection control circuit 202 refers to the phase number of the clock signal clkA and creates the enable signals en1 and en2 to operate alternately the flip-flops 231 and 232 every one cycle. That is, the signals Dout1 and Dout2 are delayed to each other by one cycle with the clock signal clkA. In detail, the signal delayed by one cycle with respect to the signal Dout1 is output as the signal Dout2. The signal delayed by one cycle with respect to the signal Dout2 is output as the signal Dout1. According to the present embodiment, the delay value Tdly usually equals to the cycle time of the clock signal clkA.

The configuration of the core B is the same as the configuration of the core B in the sixth embodiment. However, the data delay selection control circuit 103 in the configuration of the core B of the sixth embodiment is replaced with the data input selection control circuit 201. The data delay selection control circuits 103 and the data input selection control circuit 201 have the same function. In the second and sixth embodiments, the signal Dout_DLY delayed with respect to the signal Dout is output usually. However, in the configuration of the present embodiment, the signals Dout1 and Dout2 are delayed and output alternately and the corresponding operation is performed.

Next, the operation of the present embodiment will be explained in detail below by referring to FIG. 16.

FIG. 16 is a timing chart explaining the operation of the present embodiment. In the present embodiment, f represent a reference frequency, 8f represents the frequency of the clock signal clkA, and 5f represents the frequency of the clock signal clkB.

Referring to FIG. 16, the clock signal clkA is used for the core A and the clock signal clkB is used for the core B. For m=8, the frequency of the clock signal clkA is 8f and the phase number ranges from 0 to 7. For n=5, the frequency of the clock signal clkB is 5f and the phase number ranges from 0 to 4. When the clock signals A and B are 0 respectively, the phases are in phase (or the rising edges of clock signals are matched). Therefore, the phase relationship is circulated every eight cycles of the clock signal clkA while the phase relationship is circulated every five cycles of the clock signal clkB. In other words, the data output selection control circuit 202 performs the data communication control by considering the phase relationship within the eight cycles of the clock signal clkA. The data input selection control circuit 201 performs the data communication control by considering the phase relationship within the five cycles of the clock signal clkB.

The function part 3A in the core A outputs Dout0.

en1 represents an enable signal for the flip-flop 231 and en2 represents an enable signal for the flip-flop 232. The data output selection control circuit 202 outputs the enable signals en1 and en2. Dout1 represents the output data from the flip-flop 231. Dout2 represents the output data from the flip-flop 232. Dsel represents the control signal from the data input selection control circuit 201. Din represents data output from the flip-flop 2.

As shown in FIG. 16, the enable signal en1 repeatedly outputs a high level and a low level alternately every one cycle to operate the flip-flop 231 every one cycle. Similarly, the enable signal en2 repeatedly outputs a high level and a low level alternately every one cycle to operate the flip-flop 232 every one cycle. The enable signals en1 and en2 are opposite in phase to each other to operate the flip-flops 231 and 232 alternately.

As shown in FIG. 16, the phase difference between the rising edge of the phase number 3 of the clock signal clkA and the rising edge of the phase number 2 of the clock signal clkB becomes Td or less. The phase difference between the rising edge of the phase number 6 of the clock signal clkA and the rising edge of the phase number 4 of the clock signal clkB becomes Td or less. This is known by the frequency of the clock signal clkA, the frequency of the clock signal clkB and the phase number of the clock signal clkB. At this time, the data input selection control circuit 201 selects, as data received by the flip-flop 2, Dout1, which is delayed by one cycle of the clock signal clkA with respect to Dout2 output from the flip-flop 232, with the timing of the rising edge of the phase number 3 of the clock signal clkA. Similarly, the data input selection control circuit 201 selects, as data received by the flip-flop 2, Dout2, which is delayed by one cycle of the clock signal clkA with respect to Dout1 output from the flip-flop 231, with the timing of the rising edge of the phase number 6. In other operations, the data input selection control circuit 201 selects in such a way that the flip-flop 2 accepts Dout1 or Dout2, not delayed. Whether or not Dout1 or Dout2 is delayed can be determined based on information about the frequencies of the clock signals clkA and clkB, which are input in the data input selection control circuit 201, and based on the phase number of the clock signal clkB.

Next, the signal Dsel, which selects Dout1 or Dout2, will be explained in detail. First, the data input selection control circuit 201 outputs the signal Dsel at a high level with the timing of the rising edge of the phase number 1 of the clock signal clkB. By doing so, the flip-flop 2 receives data Dout2, which is output by the flip-flop 232 with the timing of the rising edge of the phase number 1 of the clock signal clkA, with the timing of the rising edge of the phase number 1 of the clock signal clkB.

Next, the data input selection control circuit 201 turns the control signal Dsel to a low level with the timing of the rising edge of the phase number 2 of the clock signal clkB. Thus, the data input selection control circuit 201 does not receive the data Dout2 output from the flip-flop 232 with the timing of the rising edge of the phase number 3 of the clock signal clkA, but receives the data Dout1 output from the flip-flop 231 with the timing of the phase number 2 of the clock signal clkA.

Next, the data input selection control circuit 201 turns the control signal Dsel to a low level, with the timing of the rising edge of the phase number 3 of the clock signal clkB. By doing so, the data input selection control circuit 201 accepts the data Dout1 output from the flip-flop 231 with the timing of the rising edge of the phase number 4 of the clock signal clkA.

Next, the data input selection control circuit 201 turns the control signal Dsel to a high level with the timing of the rising edge of the phase number 4 of the clock signal clkB. Thus, the data input selection control circuit 201 does not receive the data Dout1 output from the flip-flop 231 with the timing of the rising edge of the phase number 6 of the clock signal clkA but receives the data Dout2 output from the flip-flop 232 with the timing of the phase number 5 of the clock signal clkA.

Next, the data input selection control circuit 201 turns the control signal Dsel to a high level with the timing of the rising edge of the phase number 0 of the clock signal clkB. By doing so, the data input selection control circuit 201 accepts the data Dout2 output from the flip-flop 232 with the timing of the rising edge of the phase number 7 of the clock signal clkA.

The above-mentioned configuration can avoid the metastability problem confronted with the asynchronous scheme. Thus, the core-to-core communications can be realized with deterministic operation in cyclic level and with low latency and low throughput.

Moreover, according to the present embodiment, the Dout1 and Dout2 change every two cycles of the clock signal clkA and data in two cycles is in a stable state. There is a margin in timing, compared with the case where the data Dout and Dout_DLY in the embodiments 2 and 6 change every one cycle of the clock signal clkA. Particularly, the timing design can be effectively facilitated as to the hold constraint of the flip-flop 2.

In the above-mentioned embodiment, the two flip-flops 231 and 232 in the core A are operated alternately. However, three flip-flops or more may be used. In such a case, the data output selection control circuit produces enable signals respectively to operate the flip-flops alternately. FIG. 17 shows a configuration including three flip-flops.

The third flip-flop 233 that outputs the signal Dout3 is added together with the flip-flops 231 and 232. The data output selection control circuit 204 outputs the enable signals en1, en2 and en3 respectively for three flip-flops to operate them sequentially. In a manner similar to that in the configuration including two flip-flops, the data input selection control circuit 203 suitably selects any one of the signals Dout1, Dout2 and Dout3. In this case, the data Dout1, Dout2, and Dout3 change every three cycles of the clock signal clkA and are stabilized during the three cycles. This feature can more facilitate the timing design.

Embodiment 8

In the above-mentioned embodiments, the rising or falling edge of the clock signal clkA is synchronized with the rising or falling edge of the clock signal clkB in a fixed period (phase number 0). However, even if the rising or falling edges of the clock signals clkA and clkB are out of phase in the phase number 0 (that is, the phase difference is not zero) but each clock signal has a fixed value Tph, the core-to-core communications can be realized in the method similar to those in the above-mentioned embodiments. In such a case, the phase difference between the edges of the clock signals clkA and clkB is shifted by Tph, compared with the case where the phase difference in the phase number 0 is zero.

As shown, for example, in FIG. 18, when the clock signal clkB is delayed by Tph in the phase number 0, with respect to the clock signal clkA, the phase difference between edges in other phase numbers is increased by Tph, compared with the case where the phase difference in the phase number 0 is zero. The data delay selection control circuit and the data input selection control circuit can perform the core-to-core communications by considering the phase Tph, in a manner similar to that in the above-mentioned embodiments.

FIG. 19 depicts a modification of the configuration shown in the seventh embodiment 7 or FIG. 15 that can operate even when the phase difference in the phase number 0 is Tph, not zero. This modification differs from the configuration of FIG. 15 in that the data input selection control circuit 201 is replaced with the data input selection control circuit 205. The data input selection control circuit 205 receives the phase difference Tph so that the control operation can be performed in consideration of the phase difference Tph. No need of adjusting the phase difference to zero in the phase number of 0 allows omission of the phase adjustment circuit 10. In other words, the present embodiment can advantageously reduce the area or power, which is required for the circuitry for the phase adjustment.

Embodiment 9

In the explanation of the above-mentioned embodiments, the delay design value Td is a constant determined at the design time. However, the delay design value Td may be a parameter variable in the circuit operation.

In such a case, the data delay selection control circuit or the data input selection control circuit performs the core-to-core communications in consideration of the delay design value Td in operation. By doing so, the core-to-core communications can be realized like the above-mentioned embodiments.

FIG. 20 shows the configuration obtained by modifying the configuration in the seventh embodiment or FIG. 15 in such a way that Td can be changed in operation. FIG. 20 differs from FIG. 15 in that the data input selection control circuit 201 is replaced with the data input selection control circuit 206. The data input selection control circuit 206 can perform the control following the variation of Td in operation by inputting the delay design value Td. That is, in the present configuration, the delay design value Td can be set adaptively and flexibly according to the degree of jitter of clock signal clkA or clkB or according to the degree of a skew between clock signal clkA and clock signal clkB. Hence, an excessive timing margin can be reduced. As a result, the configuration has the effect that the reliability of core to core communications is ensured while the communication performance can be improved.

BRIEF DESCRIPTION OF THE DRAWINGS

FIG. 12 is a diagram illustrating the configuration of a conventional synchronous circuit.

EXPLANATION OF SYMBOLS

Figure 1:
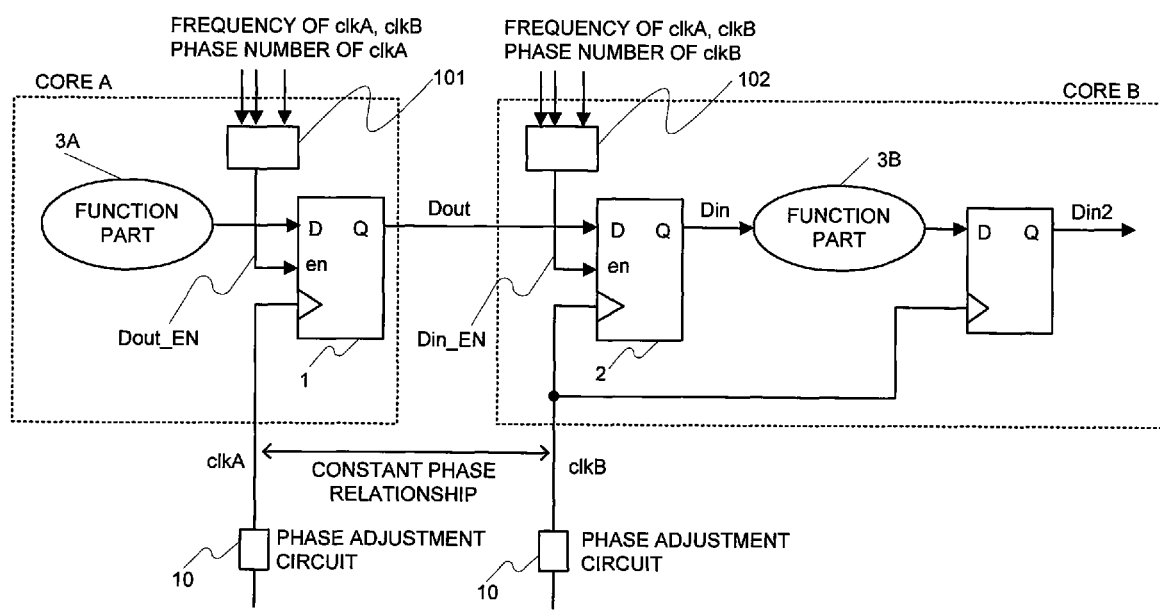
FIG. 1 is a diagram illustrating a configuration according to the present invention.
Figure 2:
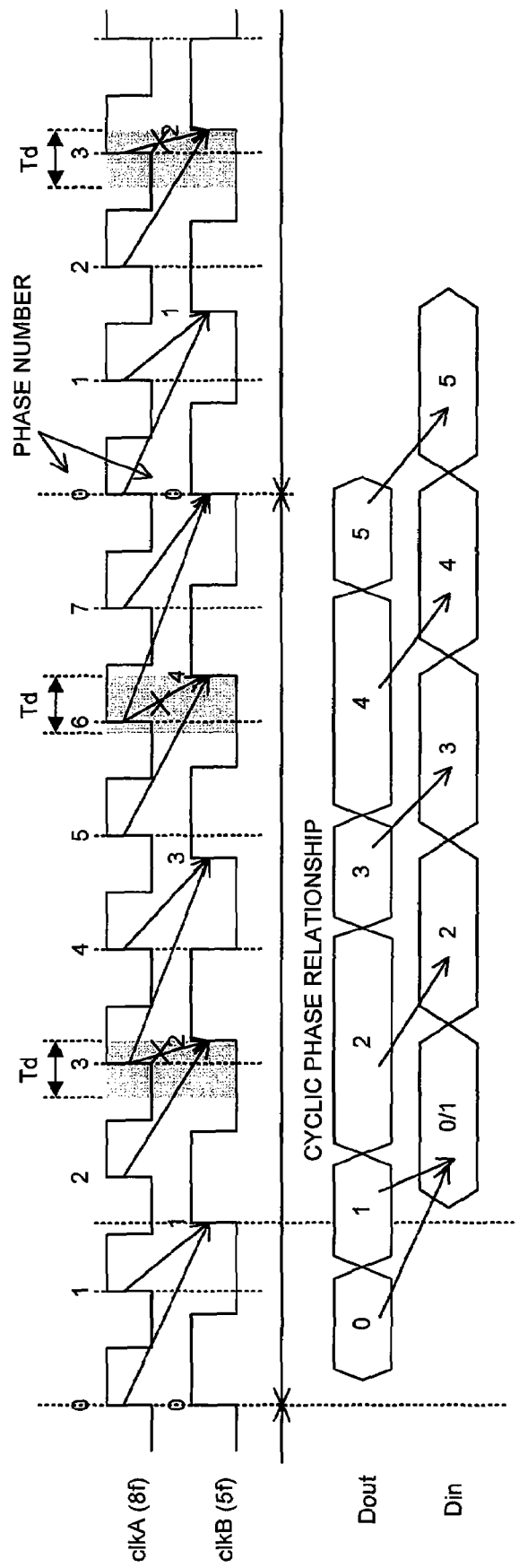
FIG. 2 is a timing chart.
Figure 3:
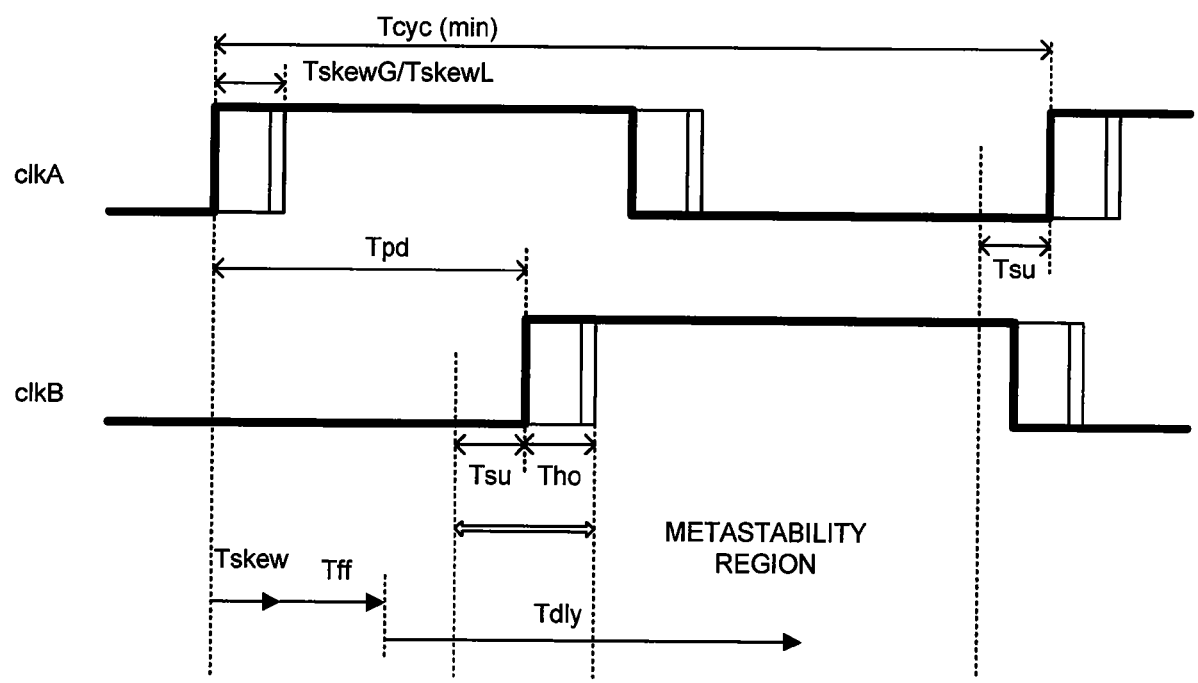
FIG. 3 is a diagram explaining Td and Tdly.
Figure 4:
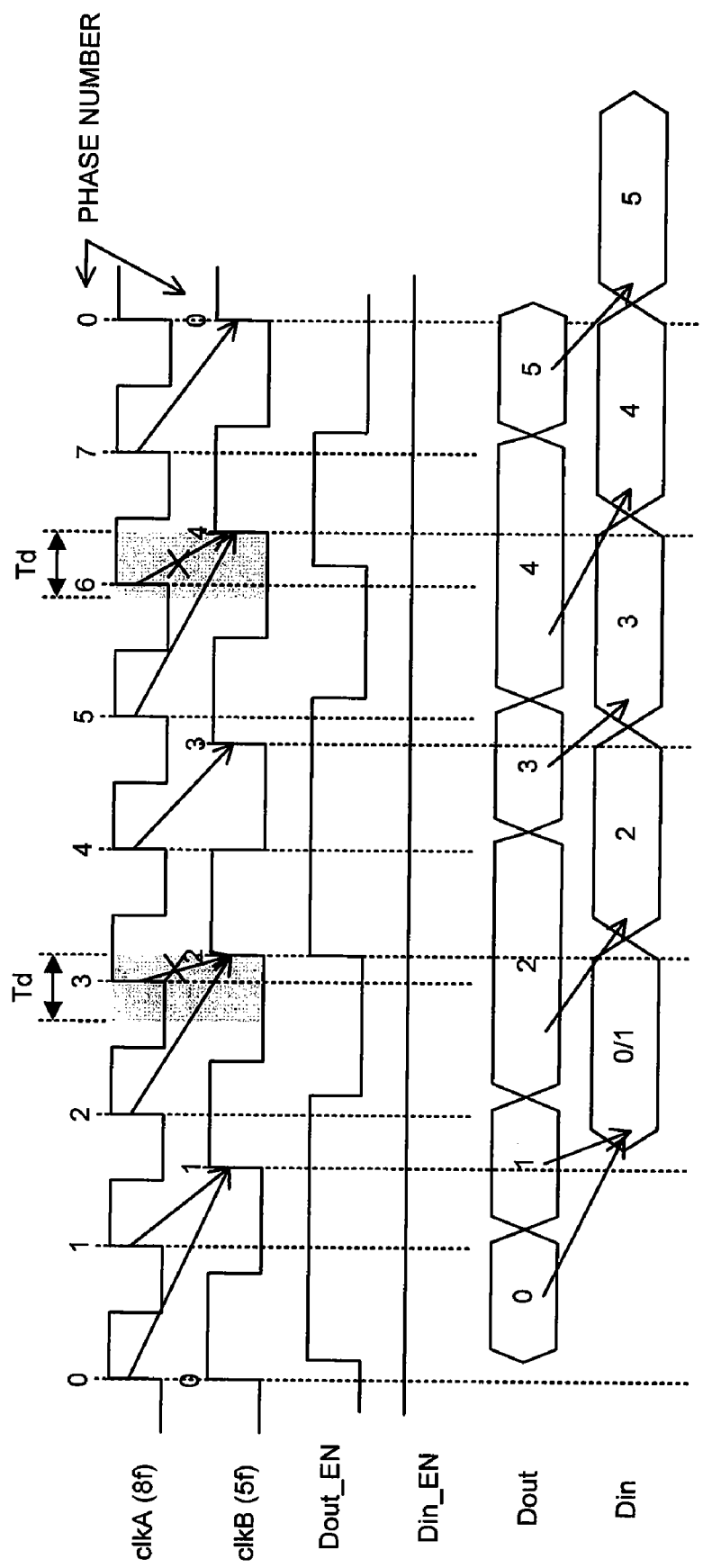
FIG. 4 is a timing chart explaining the operation of a first embodiment according to the present invention.
Figure 5:
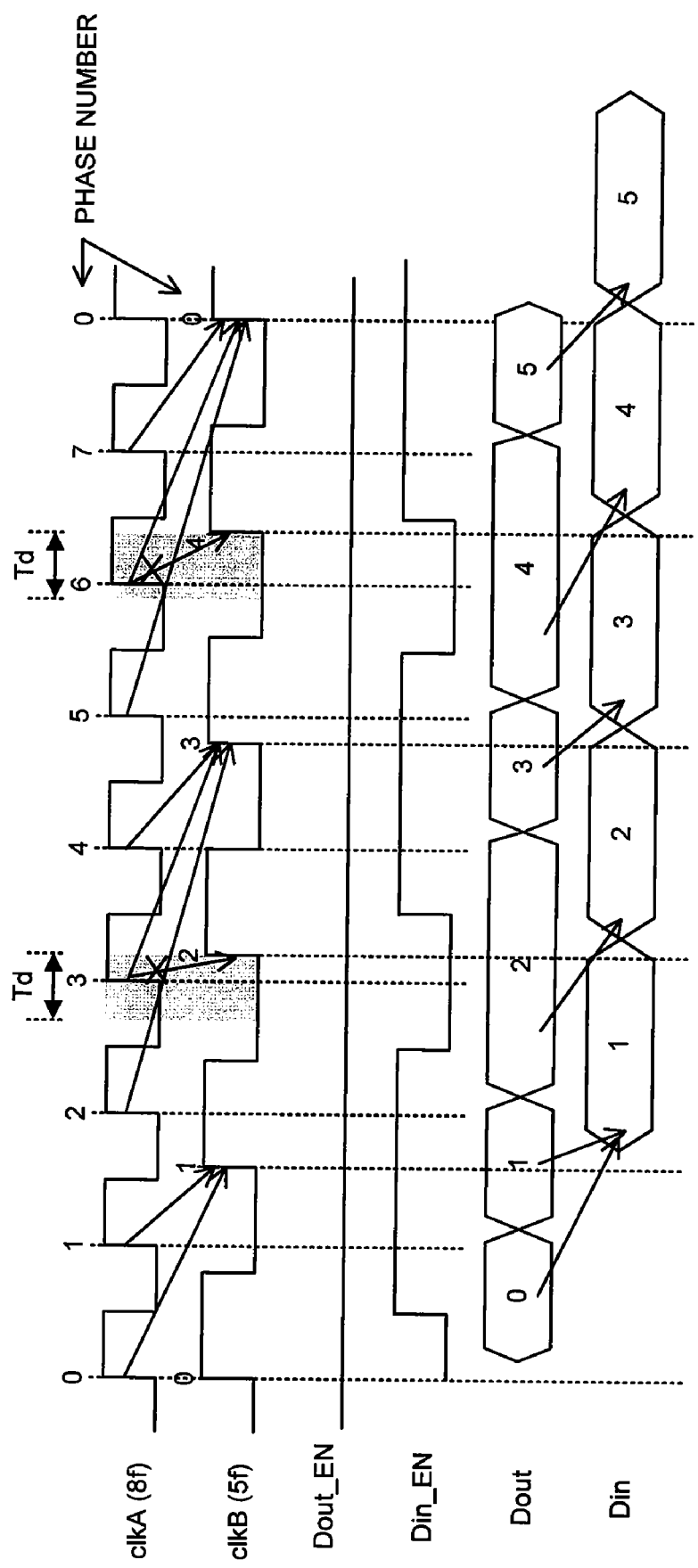
FIG. 5 is a timing chart explaining the operation of the first embodiment of the present invention.
Figure 6:
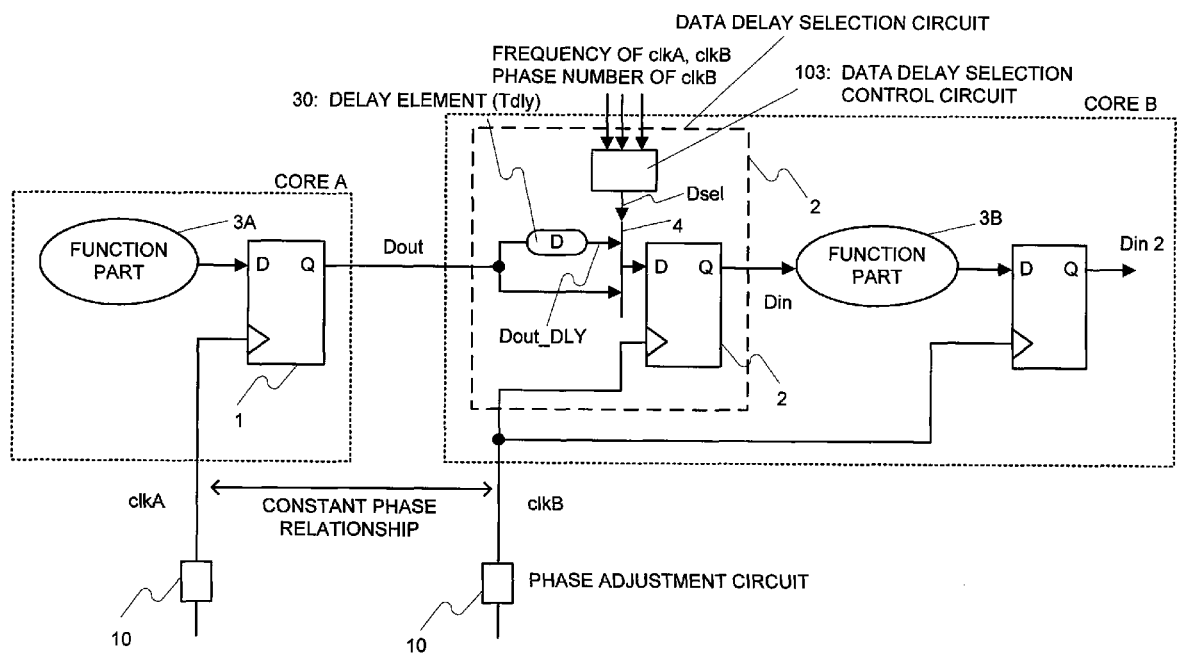
FIG. 6 is a diagram illustrating the configuration of a second embodiment according to the present invention.
Figure 7:
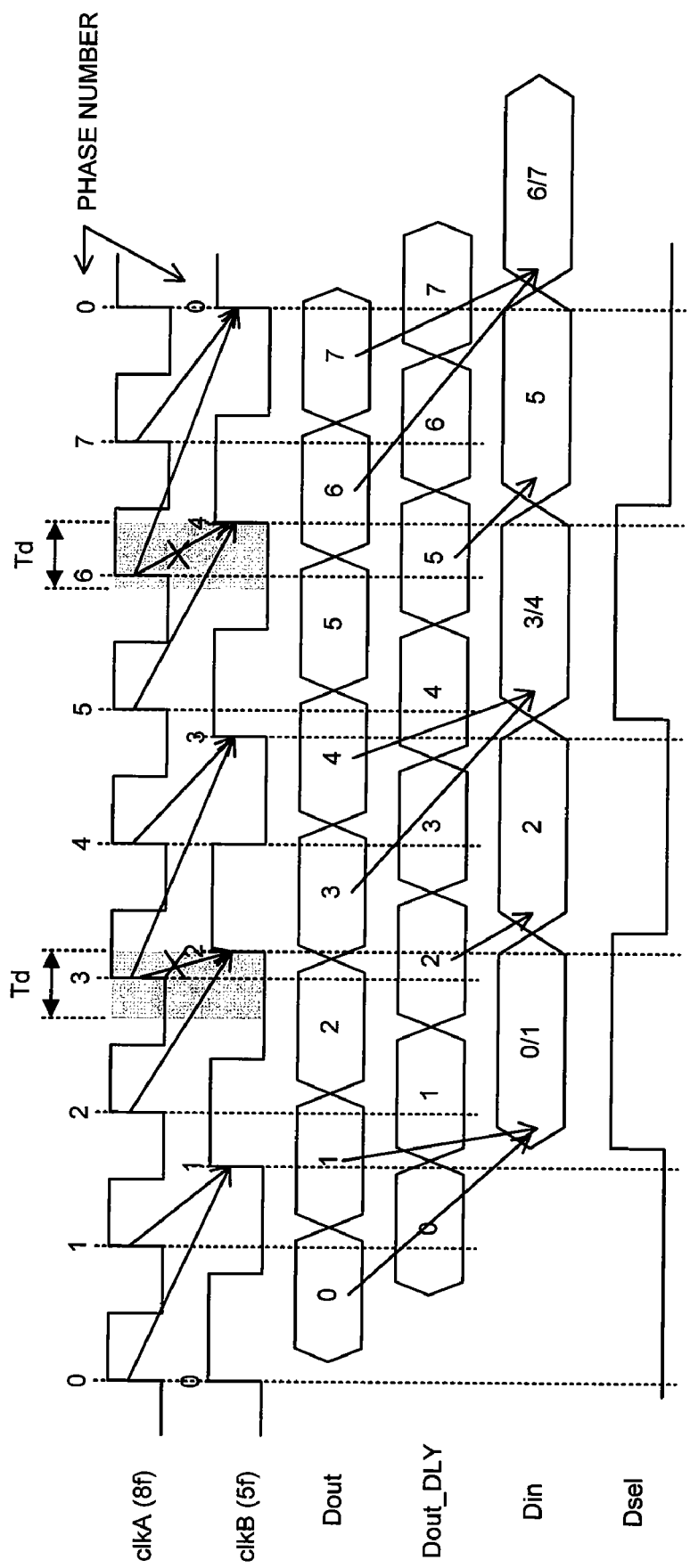
FIG. 7 is a timing chart explaining the operation of the second embodiment of the present invention.
Figure 8:
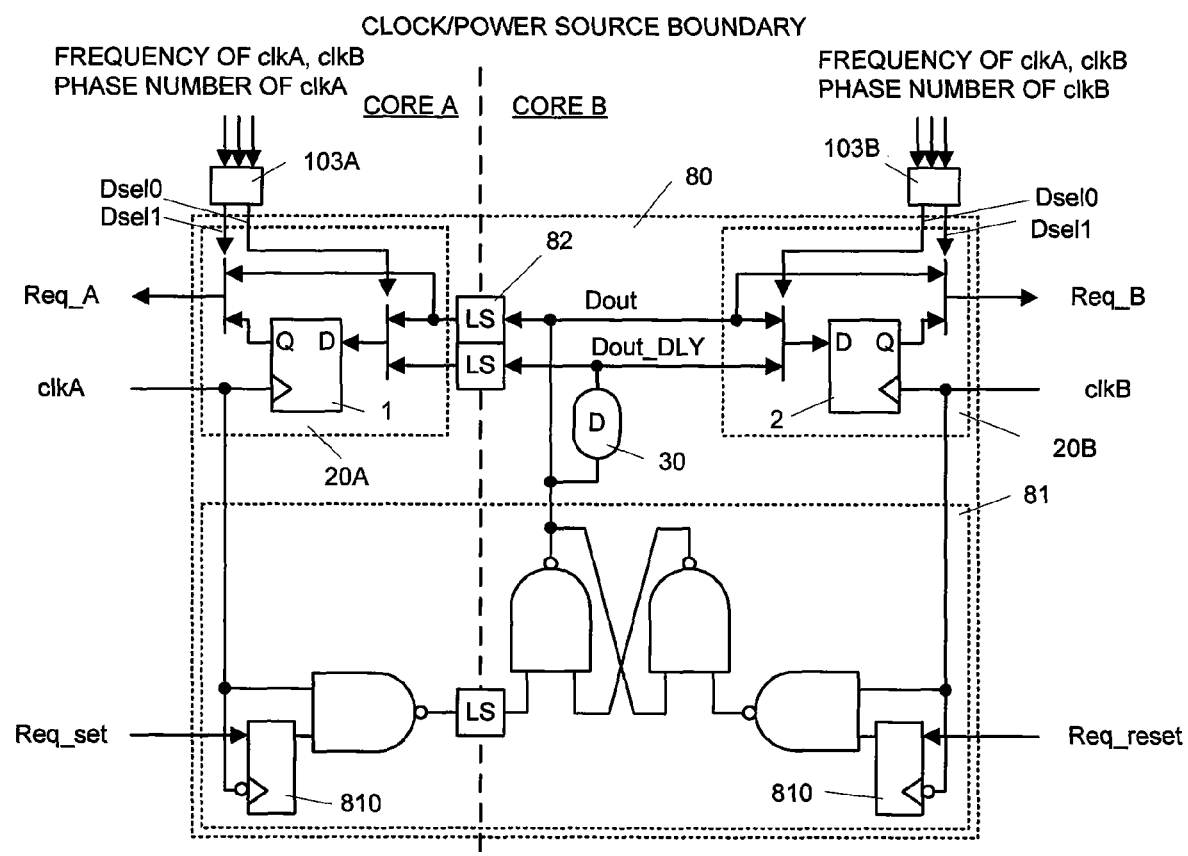
FIG. 8 is a diagram illustrating the configuration of a third embodiment according to the present invention.
Figure 9:
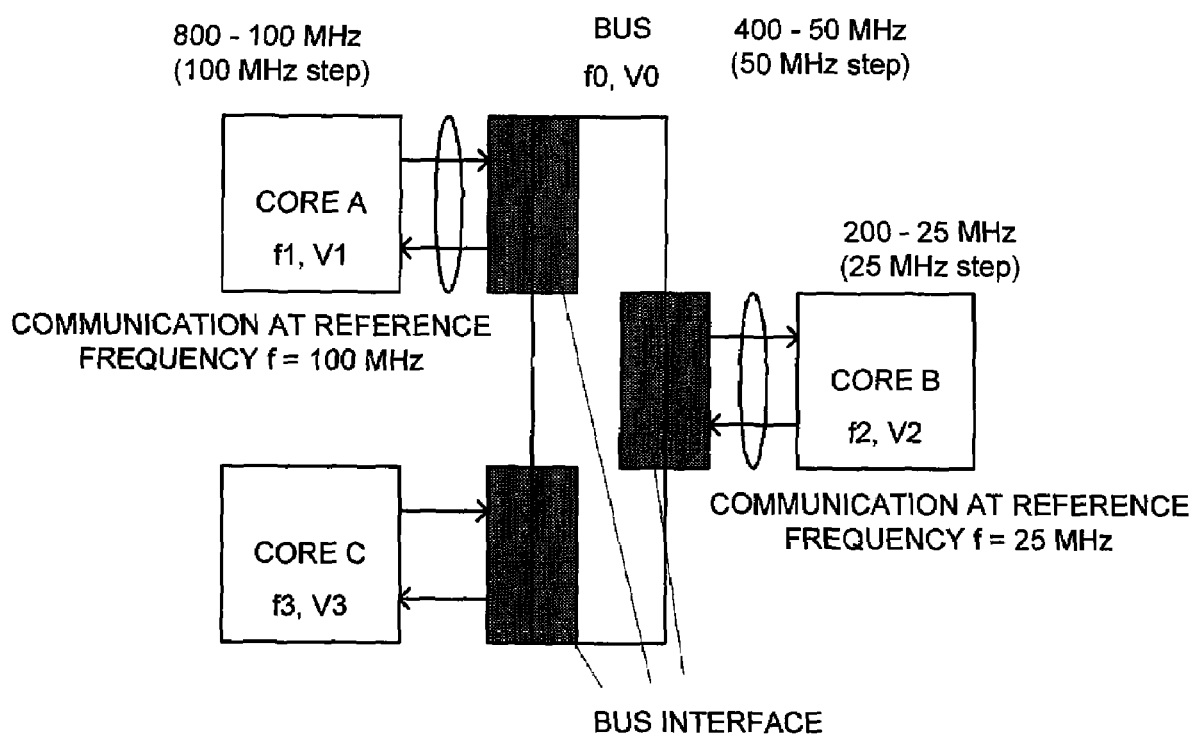
FIG. 9 is a block diagram explaining a fourth embodiment according to the present invention.
Figure 10:
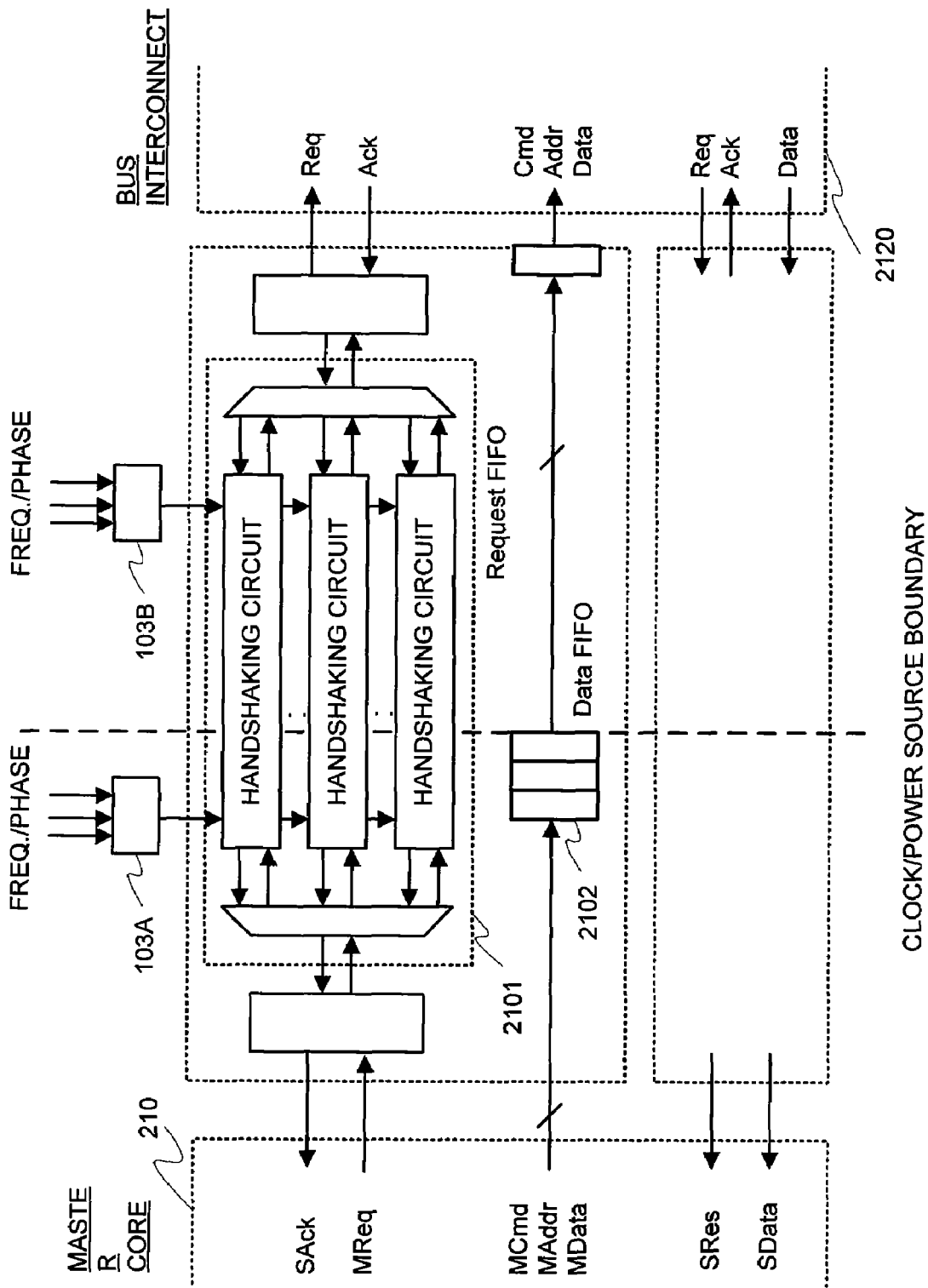
FIG. 10 is a diagram illustrating the configuration of a bus interface according to the fourth embodiment of the present invention.
Figure 11:
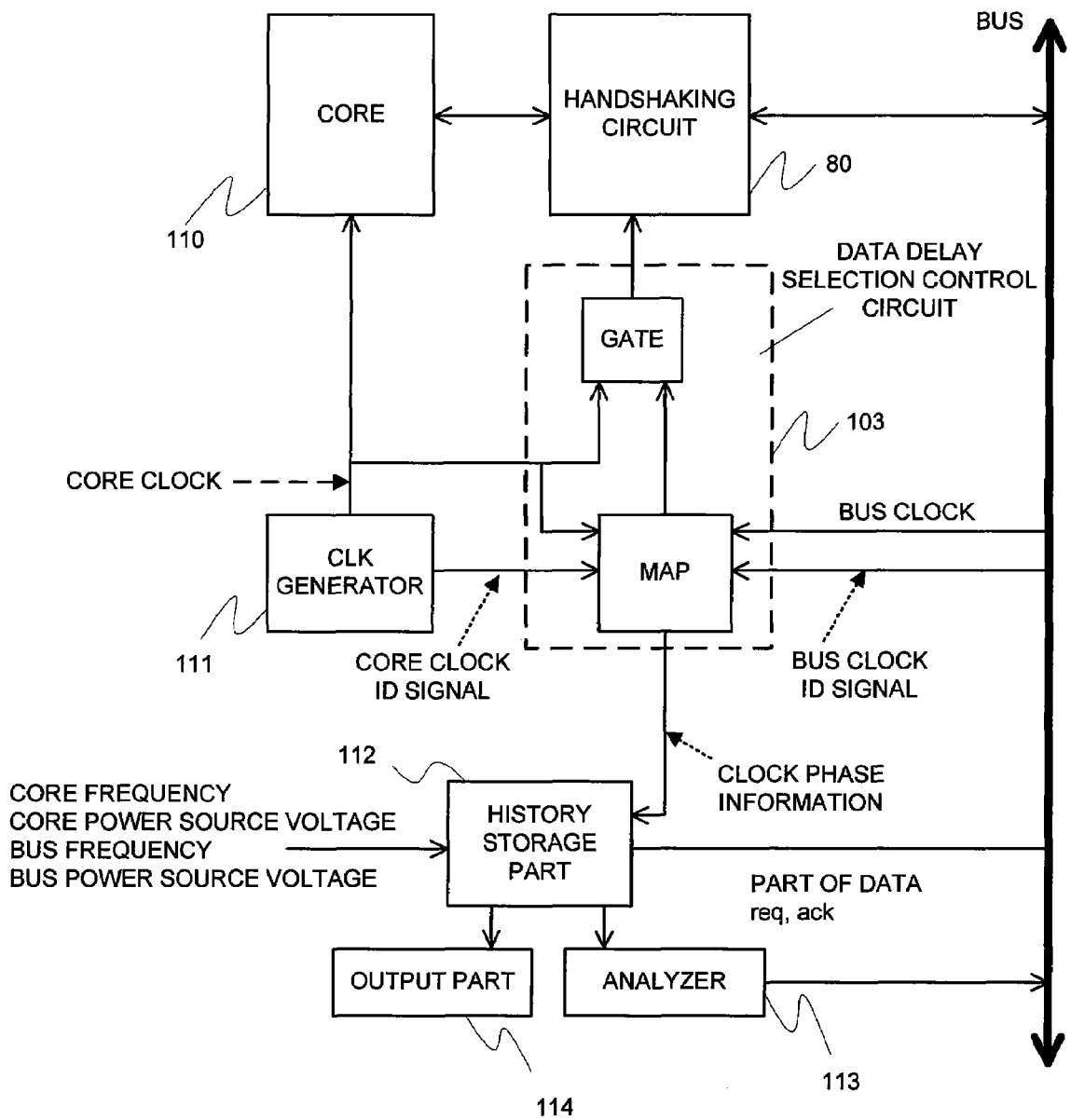
FIG. 11 is a diagram illustrating the configuration of an on-chip debugging circuit according to the fifth embodiment of the present invention.
Figure 13:
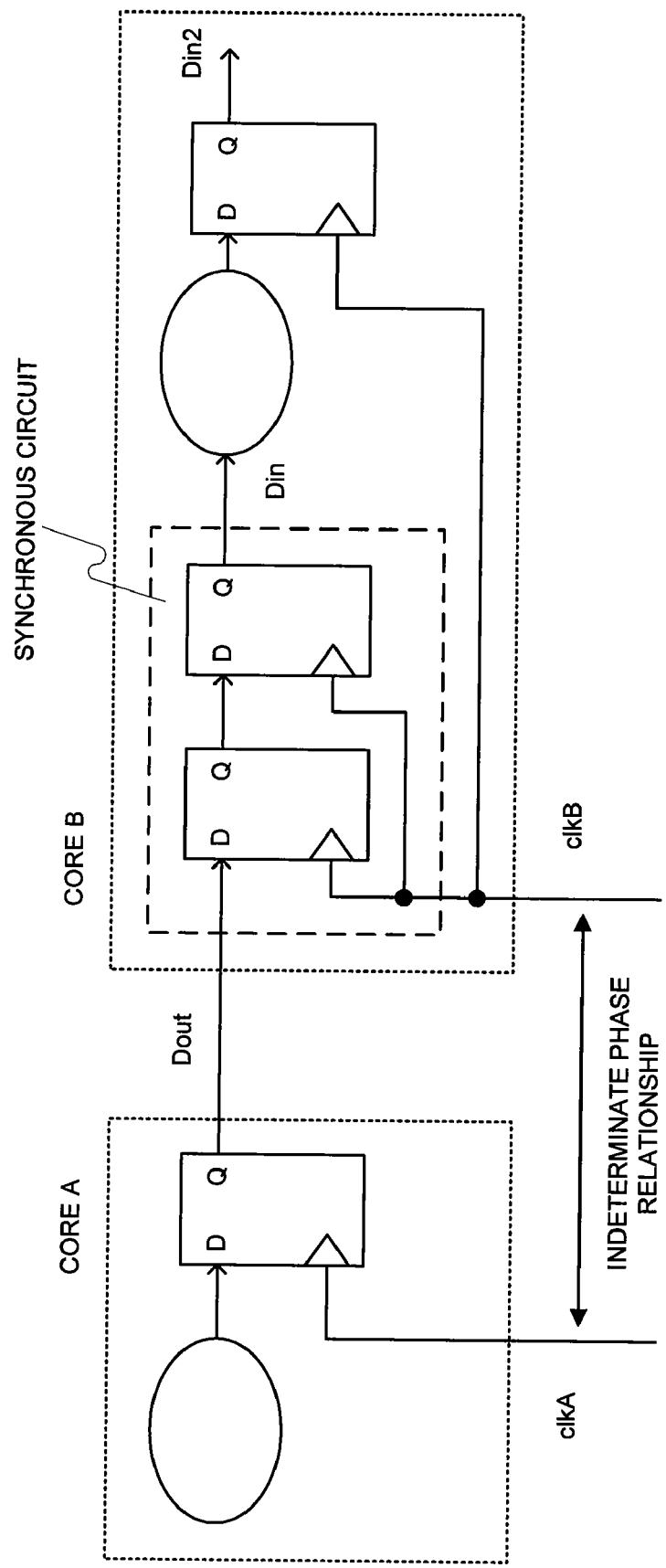
FIG. 13 is a diagram illustrating the configuration of a conventional asynchronous circuit.
Figure 14:
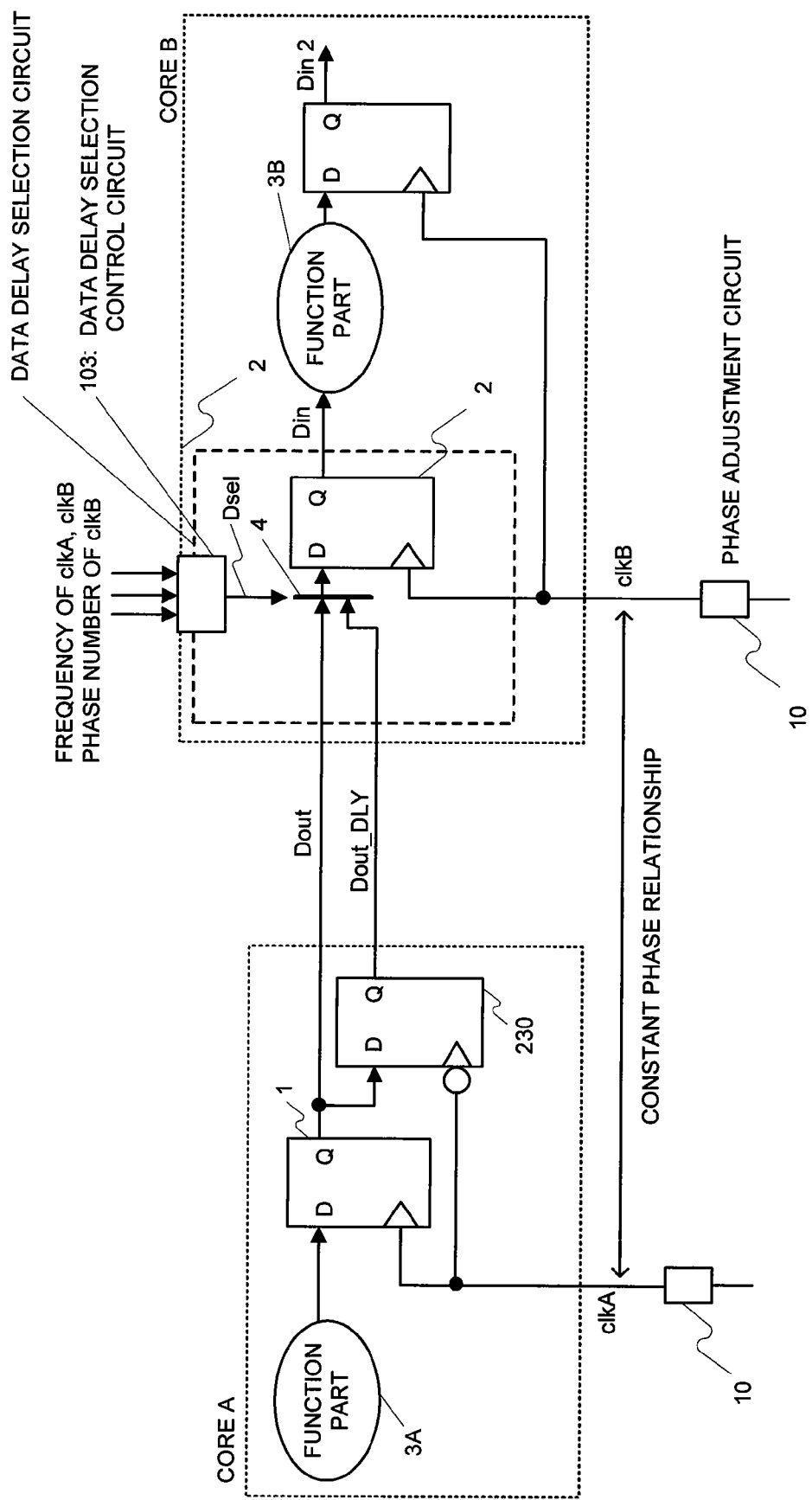
FIG. 14 is a diagram illustrating the configuration of a sixth embodiment according to the present invention.
Figure 15:
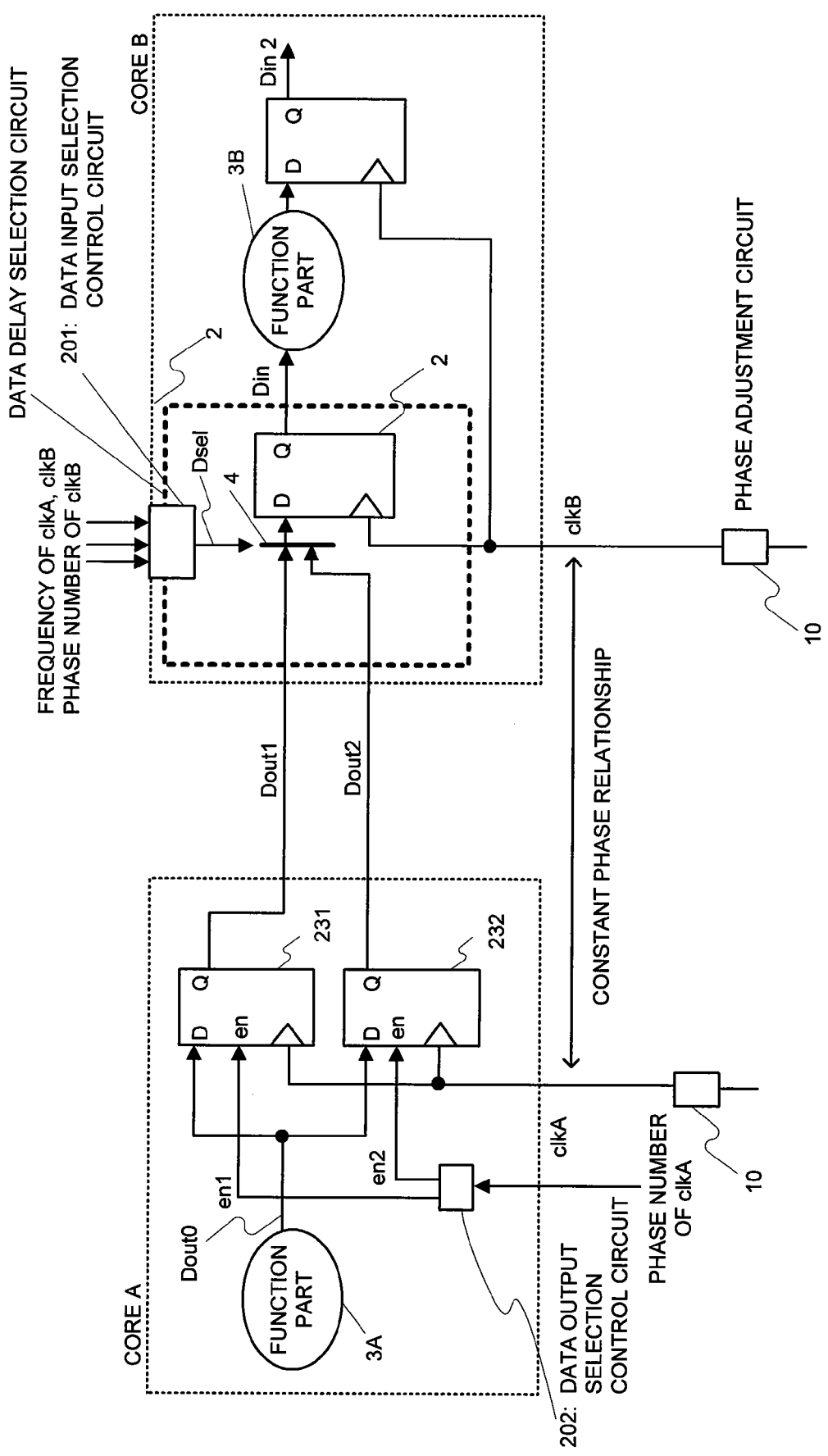
FIG. 15 is a diagram illustrating the configuration of a seventh embodiment according to the present invention.
Figure 16:
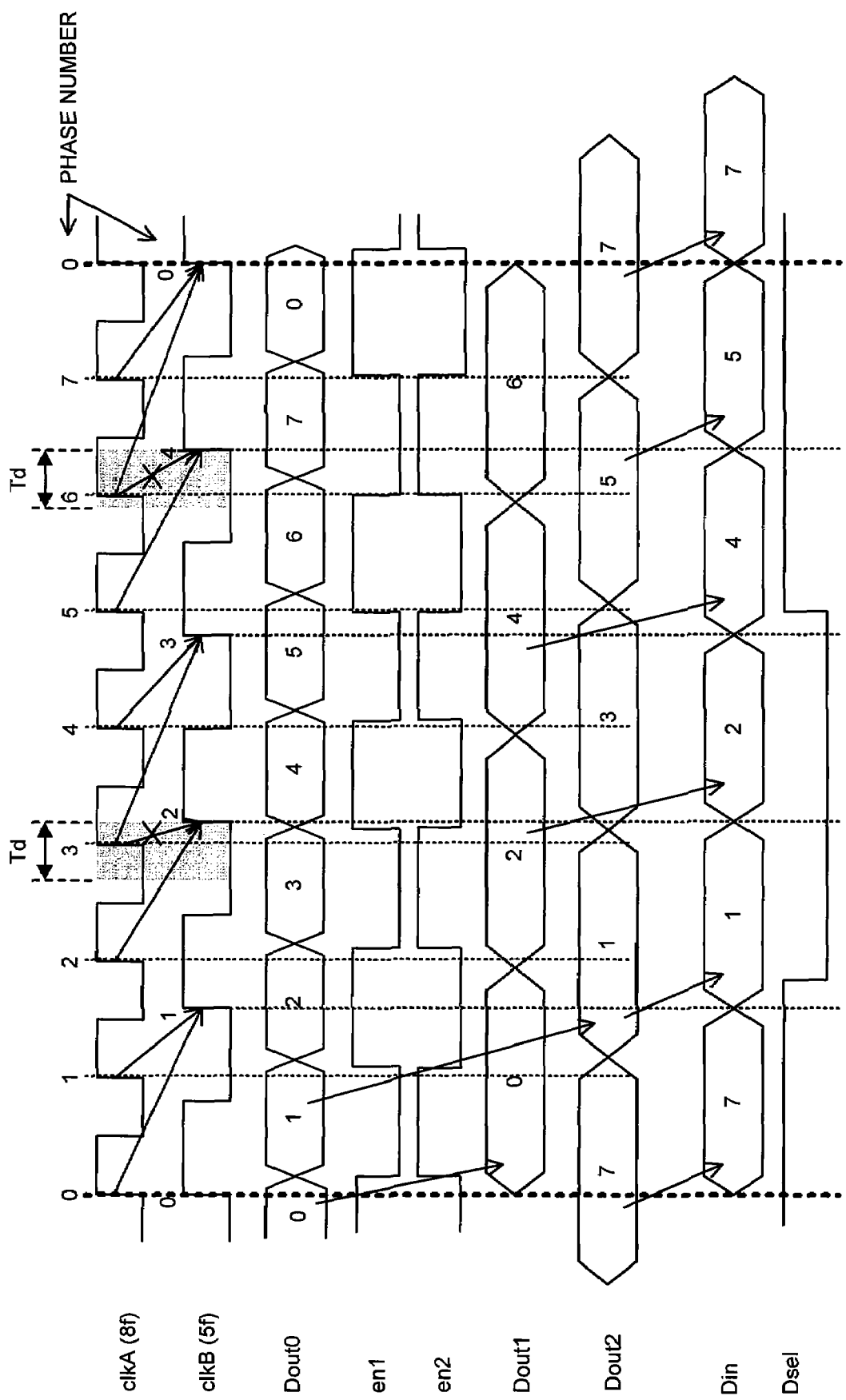
FIG. 16 is a timing chart illustrating the operation of the seventh embodiment of the present invention.
Figure 17:
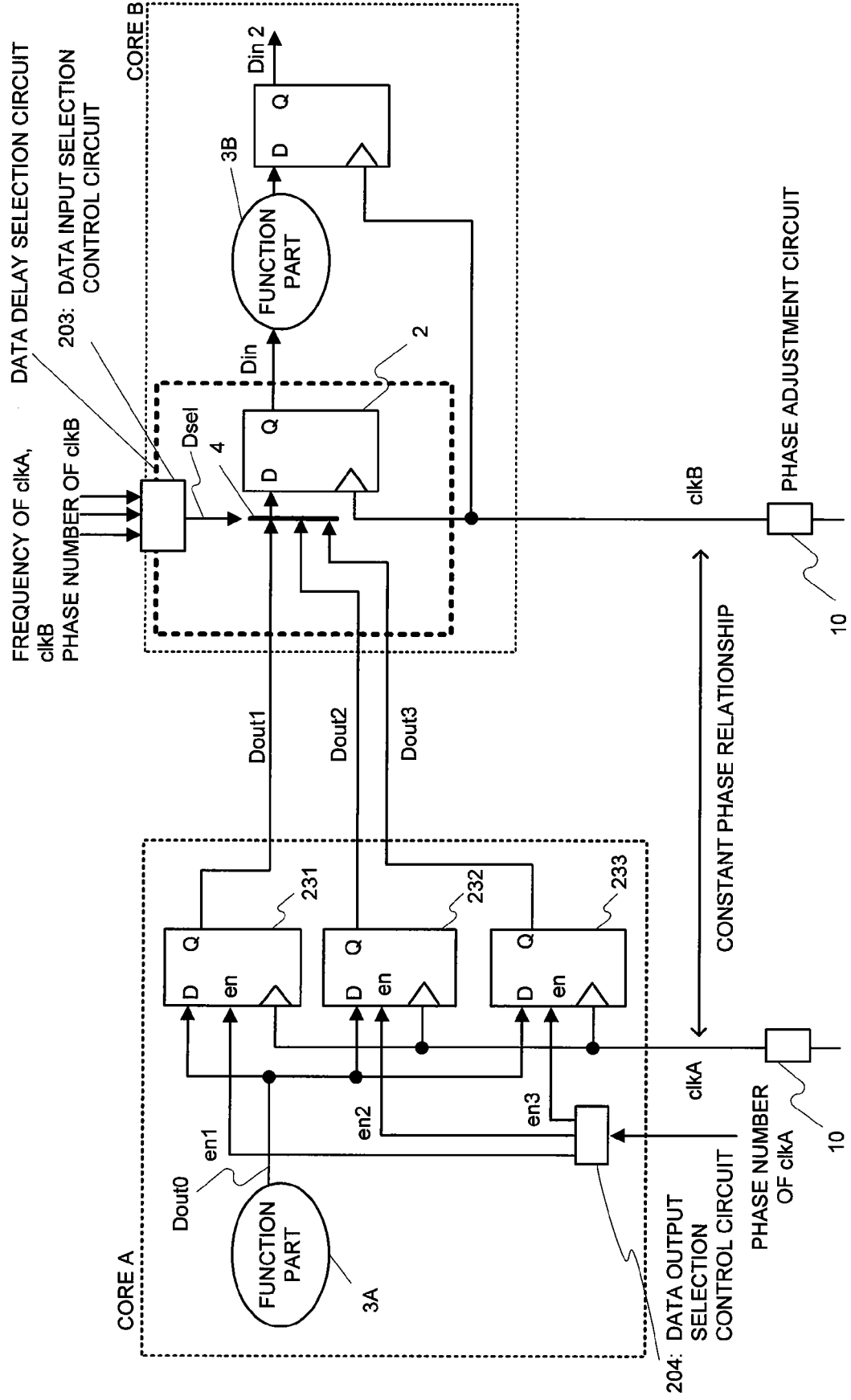
FIG. 17 is a diagram illustrating the second configuration of the seventh embodiment according to the present invention.
Figure 18:
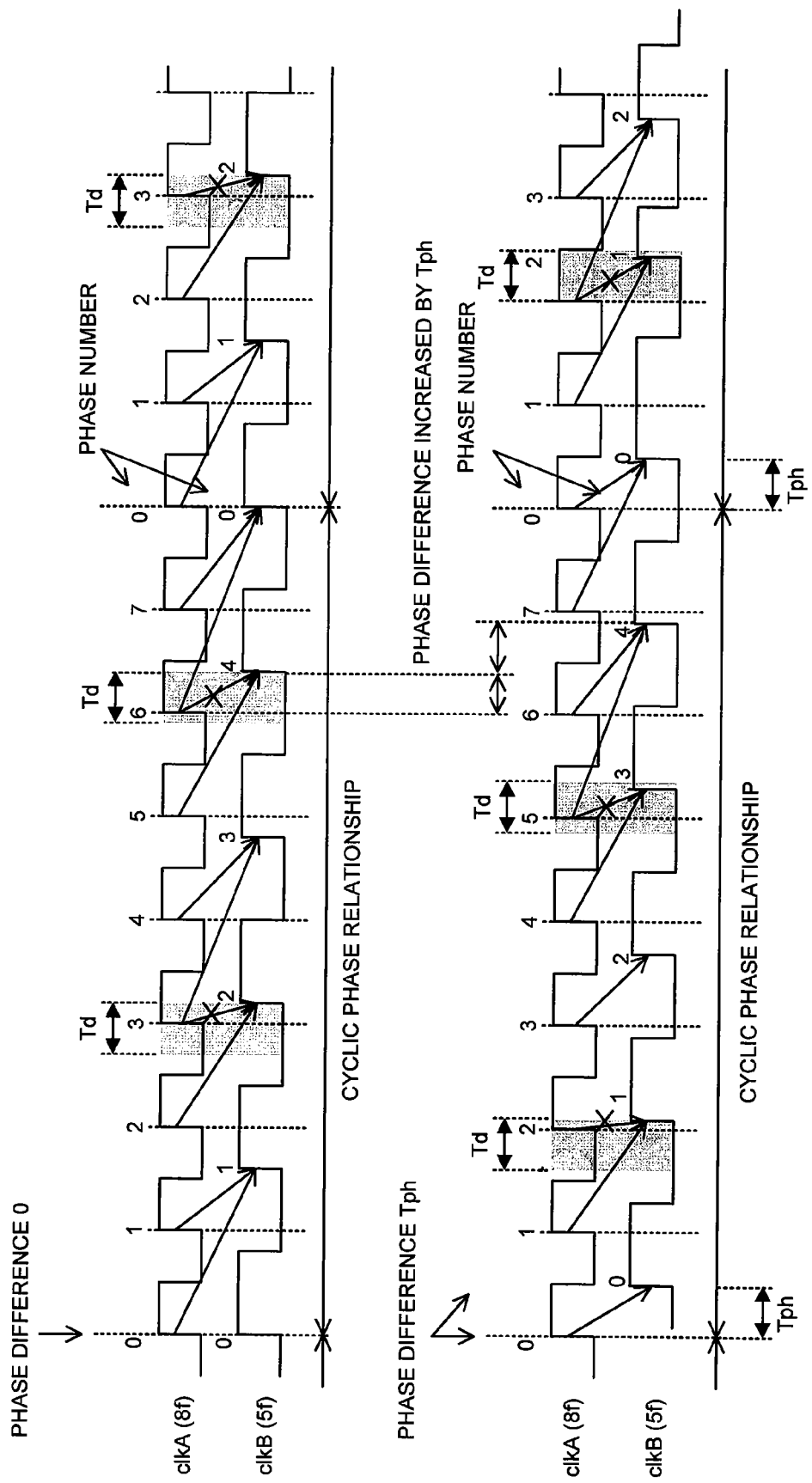
FIG. 18 is a timing chart illustrating the operation of an eighth embodiment of the present invention.
Figure 19:
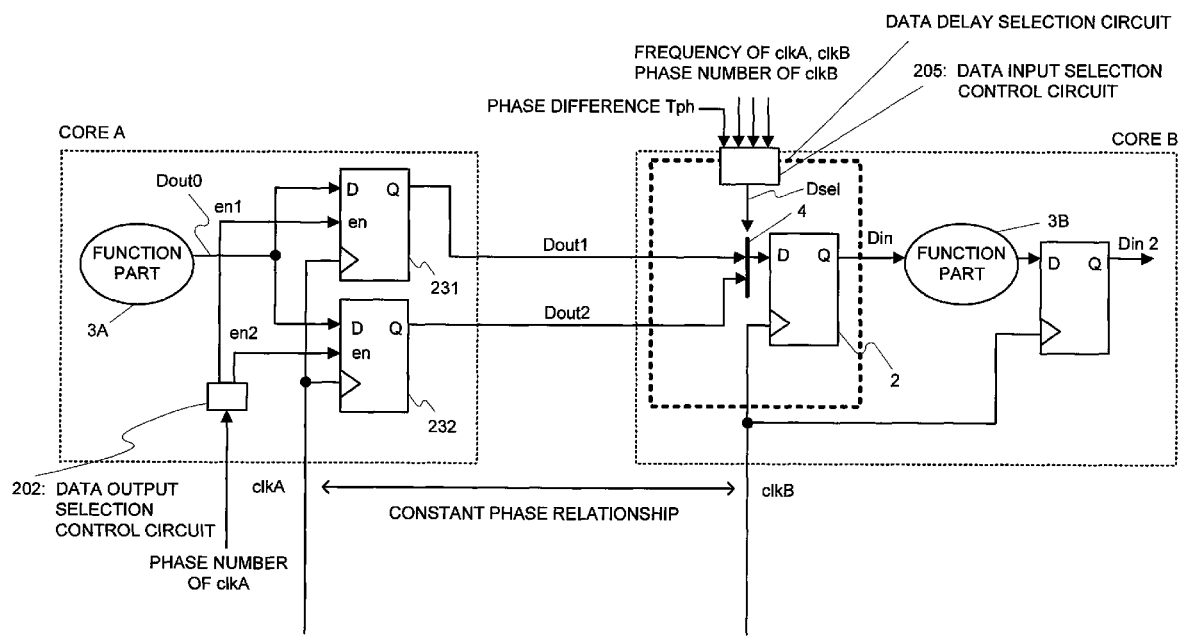
FIG. 19 is a diagram illustrating the configuration of the eighth embodiment according to the present invention.
Figure 20:
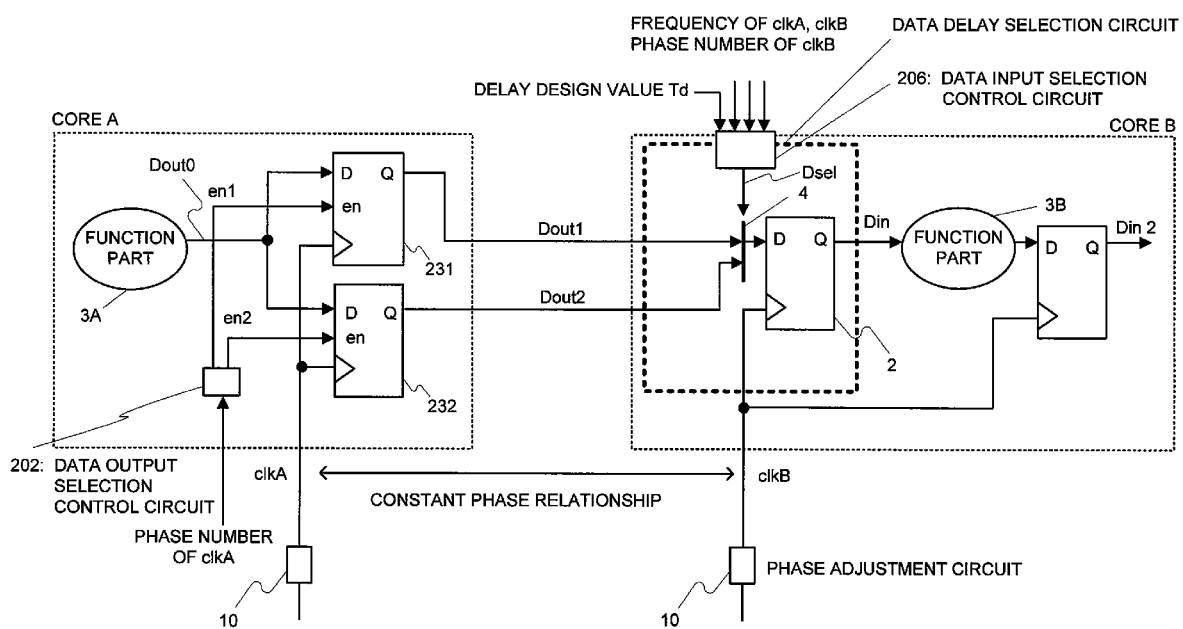
FIG. 20 is a diagram illustrating the configuration of a ninth embodiment according to the present invention.

1 Flip-flop in core A
2 Flip-flop in core B
10 Phase adjustment circuit
80 Handshaking circuit
81 Synchronous SR flip-flop
82 Level shifter
101 Data output control circuit
102 Data input control circuit
103 Data selection control circuit
111 CLK generator
112 History storage part
113 Analyzer
810 Level shifter

The invention claimed is:

1. A semiconductor device comprising:
a first signal processing circuit for outputting data based on a first clock signal;
a second signal processing circuit for receiving data based on a second clock signal that either has a phase that coincides with a rising or falling edge of said first clock signal in a constant period, or has a phase difference of a fixed value that coincides with the rising or falling edge of said first clock signal, in a constant period; and
a control circuit for controlling in such a way that data only arriving prior to a setup time of said second clock signal is received, said control circuit comprising a delay element and a delay selection control circuit, wherein said delay element produces delayed data from the received data, and said delay selection control circuit selects data from the received data and the delayed data based on whether the received data arrives a constant time prior to said setup time.

2. A semiconductor device comprising,
a first signal processing circuit for outputting data based on a first clock signal, the first signal processing circuit comprising a plurality of flip-flops each for outputting data in a different cycle of said first clock signal;
a second signal processing circuit for receiving data based on a second clock signal that either has a phase that coincides with that of the rising or falling of said first clock signal in a constant period, or has a phase difference of a fixed value with the rising or falling edge of said first clock signal, in a constant period; and
a control circuit for controlling data received by said second signal processing circuit, based on whether an output of a flip-flop in said plurality of flip-flops arrives before a setup time of said second clock signal.

3. The semiconductor device of claim 1, wherein said control circuit creates a control signal, based on information about said first clock signal and said second clock signal, and varies the control signal based on rising or falling timing of a clock signal of a signal processing circuit that said control signal is input.

4. The semiconductor device of claim 2, wherein said control circuit creates a control signal based on information about said first clock signal and said second clocks signal, and varies the control signal based on rising or falling timing of a clock signal of a signal processing circuit that said control signal is input.

5. The semiconductor device defined in claim 1, wherein said delay element delays data not arriving prior to said setup time by one clock of said second clock signal.

6. The semiconductor device defined in claim 1, wherein said data is process request data representing a process request or process request reset data representing that process request data has been received, which is output from a first function part, which performs a predetermined operation in sync with said first clock signal.

7. The semiconductor device defined in claim 6, wherein said process request data or said process request reset data is data transmitted and received between said first function part and a second function part, which performs a predetermined operation in sync with said second clock signal.

8. The semiconductor device defined in claim 6, wherein said process request data or said process request reset data is data transmitted and received between said first function part and a bus.

9. The semiconductor device defined in claim 1, further comprising history storage means for storing as history information an operation status during transmission and reception of said data.

10. The semiconductor device defined in claim 9, further comprising analysis means for analyzing a cause in degradation of the performance of a semiconductor device based on history information stored in said history storage means.

11. The semiconductor device defined in claim 9 or 10, wherein said history storage means includes output means for outputting said history information externally.

12. The semiconductor device defined in claim 1, wherein said setup time is dynamically varied in operation.

13. A communication control method for a semiconductor device comprising the steps of:
   a delay circuit delaying data received from a first signal processing circuit that outputs data based on a first clock signal;
   controllably receiving either the data or the delayed data based on whether the data arrives a constant time before a setup time of a second clock signal having either a phase that coincides with a rising or falling edge of said first clock signal in a predetermined period, or having a phase difference that is a fixed value coinciding with the rising or falling edge of said first clock signal in the predetermined period.

14. A communication control method for a semiconductor device comprising the steps of:
   each flip-flop in a plurality of flip-flops outputting data in a different cycle of a first clock signal;
   selecting data output by said flip-flops based on whether the data arrives before a setup time of a second clock signal having either a phase that coincides with a rising or falling edge of said first clock signal in a predetermined period, or having a phase difference of a fixed value with respect to the rising or falling edge of said first clock signal, in a predetermined period.

15. The communication control method defined in claim 13, further comprising the steps of: controlling based on information about said first clock signal.

16. The communication control method defined in claim 13, further comprising the step of delaying data not arriving before said setup time by one delay of said second clock signal by means of said delaying part.

17. The communication control method defined in claim 13 or 14, further comprising the step of dynamically varying said setup time in operation.

18. The communication control method defined in claim 13 or 14, further comprising the step of controllably receiving selectively data arriving prior to said setup time, of plural pieces of data output in a different cycle of said first clock signal.

* * * * *